(12) United States Patent
Uetabira

(10) Patent No.: US 8,947,421 B2
(45) Date of Patent: Feb. 3, 2015

(54) METHOD AND SERVER COMPUTER FOR GENERATING MAP IMAGES FOR CREATING VIRTUAL SPACES REPRESENTING THE REAL WORLD

(75) Inventor: Shigeki Uetabira, Kagoshima (JP)

(73) Assignee: Interman Corporation, Kagoshima (JP)

(*) Notice: Subject to any disclaimer, the term of this patent is extended or adjusted under 35 U.S.C. 154(b) by 1336 days.

(21) Appl. No.: 12/259,637

(22) Filed: Oct. 28, 2008

(65) Prior Publication Data

US 2009/0109216 A1    Apr. 30, 2009

(30) Foreign Application Priority Data

Oct. 29, 2007  (JP) ................................. 2007-280927
Oct. 28, 2008  (JP) ................................. 2008-277489

(51) Int. Cl.
*G06T 15/00*  (2011.01)
*G06T 17/05*  (2011.01)
*G06F 17/30*  (2006.01)

(52) U.S. Cl.
CPC .......... *G06T 17/05* (2013.01); *G06F 17/30905* (2013.01)
USPC ....................................................... 345/419

(58) Field of Classification Search
None
See application file for complete search history.

(56) References Cited

U.S. PATENT DOCUMENTS

| | | | |
|---|---|---|---|
| 5,448,696 A * | 9/1995 | Shimada et al. ............... | 715/853 |
| 6,587,784 B1 * | 7/2003 | Okude et al. .................. | 701/454 |
| 7,570,261 B1 * | 8/2009 | Edecker et al. ............... | 345/420 |
| 2002/0042819 A1 * | 4/2002 | Reichert et al. ............... | 709/217 |
| 2004/0012506 A1 * | 1/2004 | Fujiwara et al. ........... | 340/995.1 |
| 2005/0177350 A1 * | 8/2005 | Kishikawa ........................ | 703/1 |
| 2005/0262062 A1 * | 11/2005 | Xia .................................... | 707/3 |
| 2006/0200312 A1 * | 9/2006 | Osaka ........................... | 701/211 |
| 2007/0073704 A1 * | 3/2007 | Bowden et al. ................. | 707/10 |

(Continued)

FOREIGN PATENT DOCUMENTS

| | | |
|---|---|---|
| JP | 04-149681 | 5/1992 |
| JP | 9330329 A | 12/1997 |

(Continued)

OTHER PUBLICATIONS

Office Action for corresponding JP Patent Application No. 2008-277489, dated Mar. 2, 2010.

(Continued)

*Primary Examiner* — Daniel Hajnik
(74) *Attorney, Agent, or Firm* — Matthew B. Dernier, Esq.; Gibson & Dernier LLP

(57) ABSTRACT

A method and server computer for generating map images and providing the map images to users through the Internet are described. Web sites are automatically and recursively visited and downloaded through hyperlinks. Content items containing address and establishment information are retrieved from the information as downloaded from the visited web sites. The content retrieved items are indexed to associate the address information items contained therein with the establishment information items contained therein about establishments which are located in the addresses associated therewith respectively. A visual indication indicative of the establishment corresponding to an establishment information item is superimposed on a map image in a position corresponding to the address of this establishment with reference to the indexed content items. The map image is transmitted to a user through the Internet in response to a request message from the user.

14 Claims, 17 Drawing Sheets

(56) References Cited

U.S. PATENT DOCUMENTS

2007/0162942 A1* 7/2007 Hamynen et al. .............. 725/105
2007/0208699 A1   9/2007 Uetabira
2007/0273558 A1* 11/2007 Smith et al. ................ 340/995.1

FOREIGN PATENT DOCUMENTS

| JP | 11232484 A | 8/1999 |
| JP | 2003166836 A | 6/2003 |
| JP | 2005201919 A | 7/2005 |
| JP | 2005266094 A | 9/2005 |

OTHER PUBLICATIONS

Sagara, Takeshi, et al., "An Efficient Method to Support Finding and Registering New Shops from the Web." IPSJ Symposium Series, DBWeb, Information Processing Society of Japan, Nov. 30, 2006, vol. 2006, No. 16, pp. 265-272 (see translated abstract).

Amazing google usage, Use maps and routes with complete control, Fun to research using map services, Nikkei PC beginners, 2007, vol. 8, Nikkei PC 21, Aug. 2007 extra issue, Japan, Nikkei Business Publications, Inc., vol. 12, No. 16, p. 26-33 Aug. 13, 2007 (See partial translation).

Office Action for corresponding Japanese Patent Application JP-2010-104018, dated Dec. 6, 2011.

* cited by examiner

| Addr.ID | Address Information | Location Information |
|---|---|---|
| KA0001 | 1-1, 1-chome, Chuou-cho, Kagoshima-shi, Kagoshima-ken | latitude 31°36', longitude 130°31' |
| KA0002 | 1-2, 1-chome, Chuou-cho, Kagoshima-shi, Kagoshima-ken | latitude 31°35', longitude 130°32' |
| KA0003 | 1-3, 1-chome, Chuou-cho, Kagoshima-shi, Kagoshima-ken | latitude 31°34', longitude 130°32' |
| KA0004 | 2-1, 1-chome, Chuou-cho, Kagoshima-shi, Kagoshima-ken | latitude 31°33', longitude 130°31' |

104

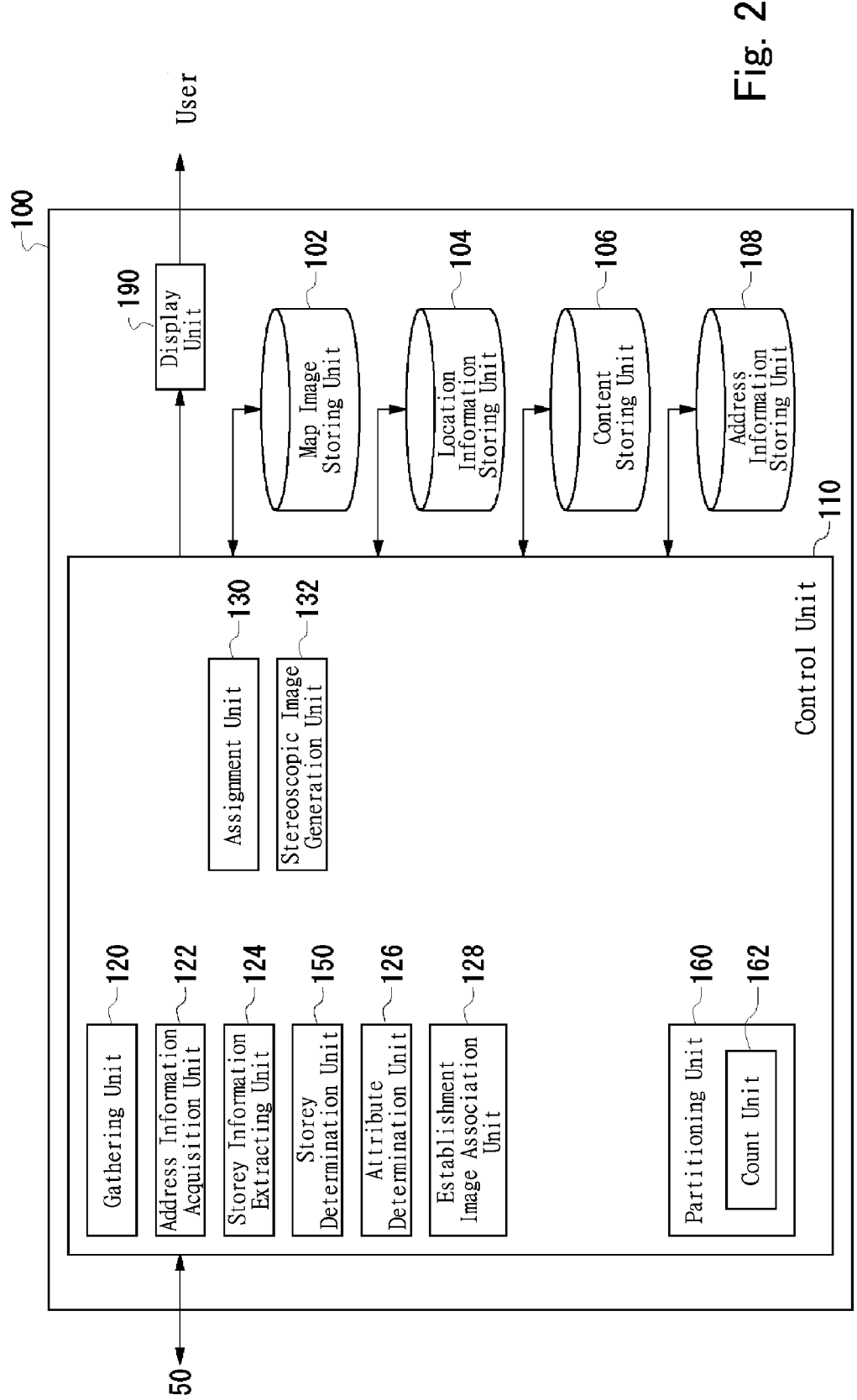

Fig. 5

| Establishment ID ~212 | Establishment Name ~214 | Address Information ~216 | Building Name ~218 | URL ~220 | Attribute Inf. Field ~222 | Establishment Image Name Field ~224 |
|---|---|---|---|---|---|---|
| 0001 | ABC | ** Bldg. 2nd flr, 1-1, 1-chome, Chuou-cho, Kagoshima-shi, Kagoshima-ken | ** Building | http://abc~ | Hairdressing Shop | Establishment Image A |
| 0002 | DEF | ** Bldg. 4th flr, 1-1, 1-chome, Chuou-cho, Kagoshima-shi, Kagoshima-ken | ** Building | http://def~ | Fashion Store | Establishment Image A |
| 0003 | GHI | ** Bldg. 10th flr, 1-1, 1-chome, Chuou-cho, Kagoshima-shi, Kagoshima-ken | ** Building | http://ghi~ | Restaurant | Establishment Image A |
| 0004 | JKL | ** Bldg. 12th flr, 1-1, 1-chome, Chuou-cho, Kagoshima-shi, Kagoshima-ken | ** Building | http://jkl~ | Restaurant | Establishment Image A |

~230

108

| Establishment ID ~212 | Establishment Name ~214 | Address Information ~216 | Building Name ~218 | URL ~220 | Attribute Inf. Field ~222 | Establishment Image Name Field ~224 |
|---|---|---|---|---|---|---|
| 0001 | ABC | ** Bldg. 2nd flr, 1-1, 1-chome, Chuou-cho, Kagoshima-shi, Kagoshima-ken | ** Building | http://abc~ | Hairdressing Shop | Establishment Image B |
| 0002 | DEF | ** Bldg. 4th flr, 1-1, 1-chome, Chuou-cho, Kagoshima-shi, Kagoshima-ken | ** Building | http://def~ | Fashion Store | Establishment Image C |
| 0003 | GHI | ** Bldg. 10th flr, 1-1, 1-chome, Chuou-cho, Kagoshima-shi, Kagoshima-ken | ** Building | http://ghi~ | Restaurant | Establishment Image D |
| 0004 | JKL | ** Bldg. 12th flr, 1-1, 1-chome, Chuou-cho, Kagoshima-shi, Kagoshima-ken | ** Building | http://jkl~ | Restaurant | Establishment Image D |

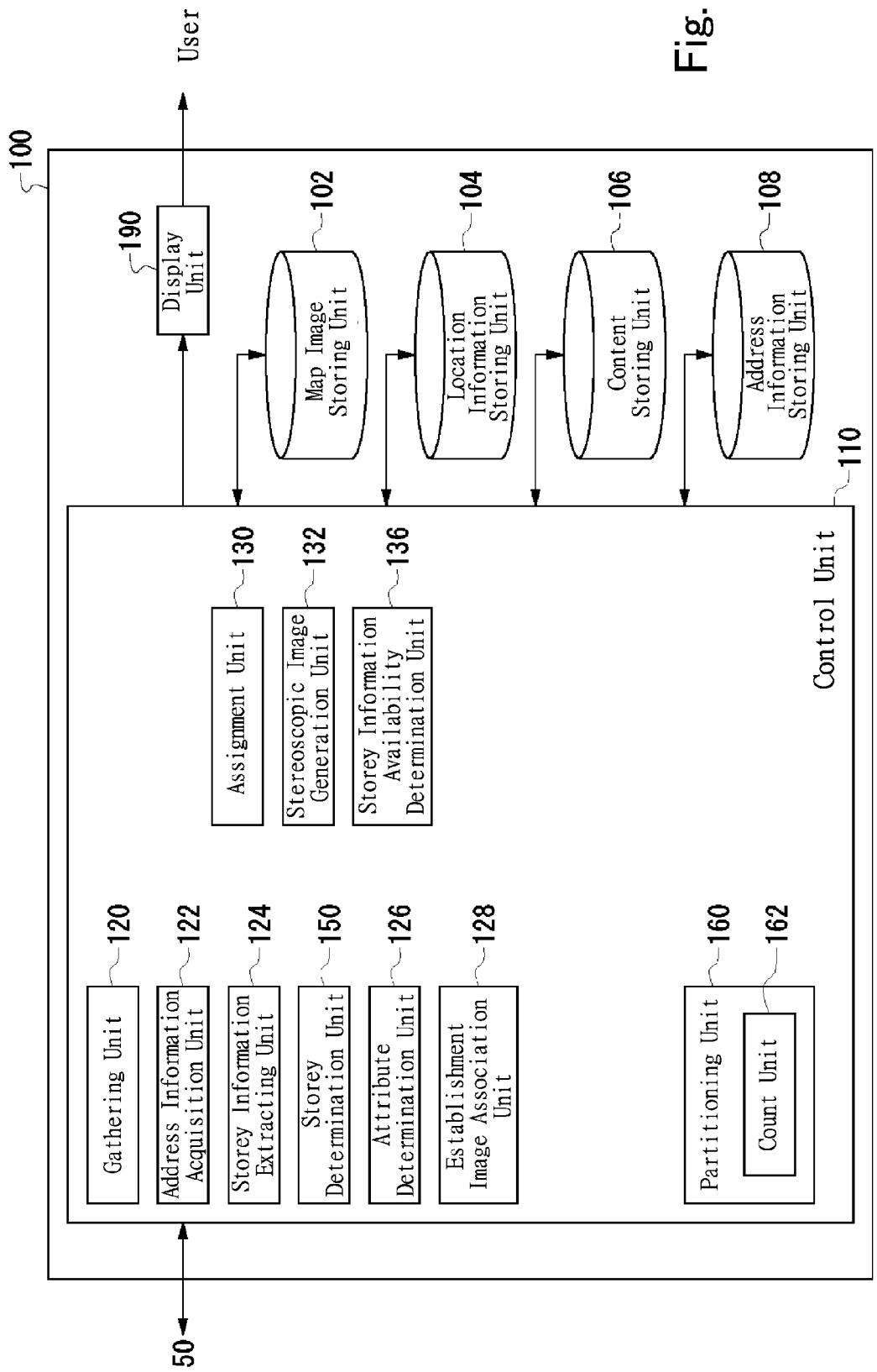

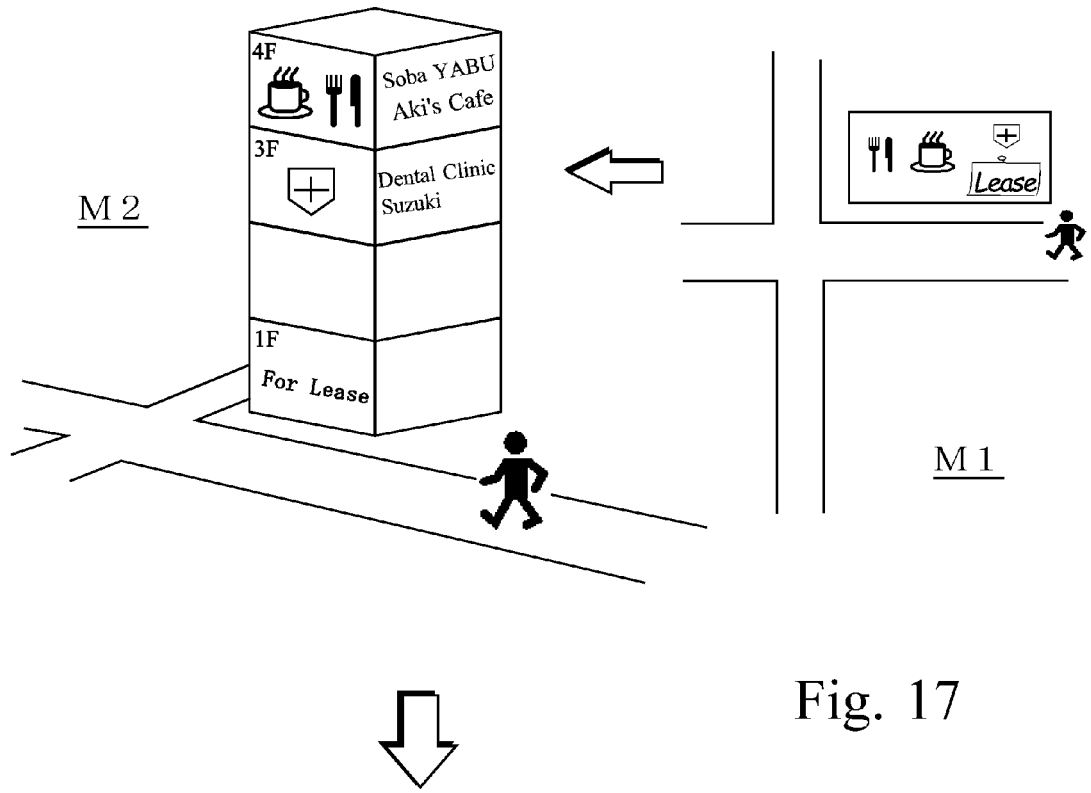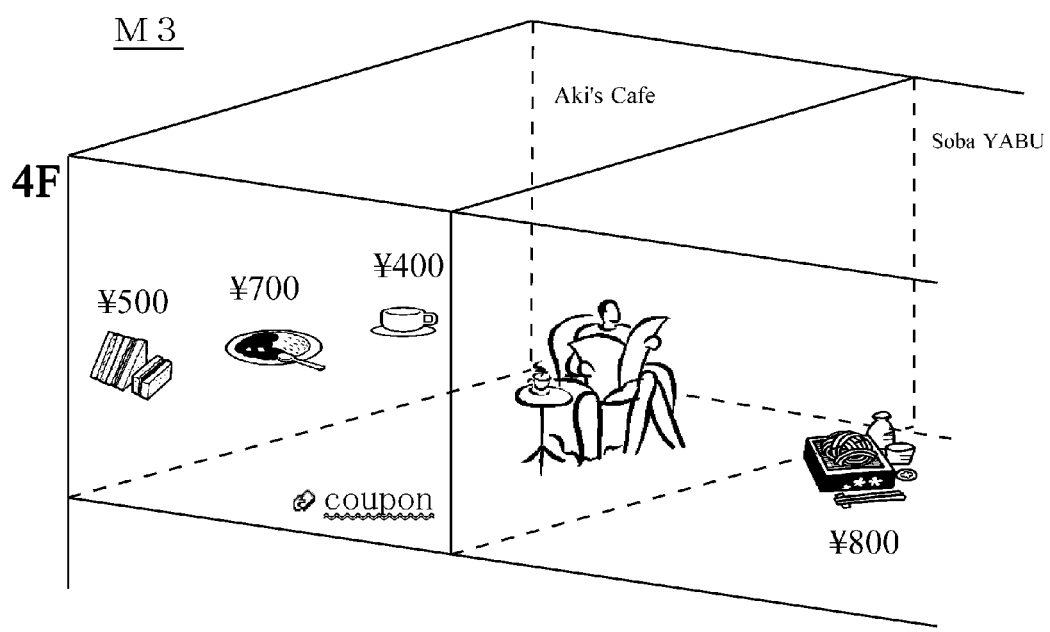
Fig. 17

METHOD AND SERVER COMPUTER FOR GENERATING MAP IMAGES FOR CREATING VIRTUAL SPACES REPRESENTING THE REAL WORLD

BACKGROUND OF THE INVENTION

1. Field of the Invention

The present invention relates generally to a method and server computer for generating map images and providing the map images to users through the Internet, and more particular to a technique of generating a virtual space in which stereoscopic images are placed to represent real buildings and the like which exist in the real world.

2. Description of the Related Art

In recent years, three-dimensional map images become available in a map space provided by a car navigation system or in a virtual space provided for realizing a virtual shopping mall. These three-dimensional map images are, for example, columnar images such as rectangular parallelepiped images and so forth which represent real world buildings. The three-dimensional map image can be created, for example, by searching a database for height data of a building in correspondence with the X and Y coordinates of a map element, and arranging a three-dimensional columnar image having this height as described in Japanese Patent Published Application No. Hei 4-149681.

However, in the case of the system as described in this publication, a user who wants to create a three-dimensional map image has to prepare a database storing height data in correspondence with the X and Y coordinates of the respective map elements for arranging columnar images. Also, in the real world, the construction of new buildings, reconstruction and demolition of old buildings are done on a routine basis, and therefore it requires a great investment of time to carry out maintenance of the database. Because of this, there is room for improvement in the technique of creating a three-dimensional map, in which columnar images are arranged, in terms of the time and labor as required.

SUMMARY OF THE INVENTION

Taking into consideration the above circumstances, it is an object of the present invention to provide a technique for generating a virtual space in which visual indications such as symbols or images are placed to represent real establishments such as buildings and the like which exist in the real world.

In accordance with an aspect of the present invention, a method of generating map images and providing the map images to users through the Internet comprises the steps of: automatically and recursively visiting web sites through hyperlinks and downloading information from the visited web sites; retrieving content items, each of which contains an establishment information item associated with an address information item, from the information as downloaded from the visited web sites; indexing the content items to associate the address information items contained in the retrieved content items with the establishment information items contained in the retrieved content items about establishments which are located in the addresses associated therewith respectively; superimposing a visual indication indicative of the establishment corresponding to an establishment information item in a position on a map image corresponding to the address of this establishment with reference to the indexed content items; and transmitting the map image with the visual indication superimposed thereon to a user through the Internet in response to a request message from the user.

In accordance with another aspect of the present invention, a server computer is capable of executing computer-implemented code and data stored in a computer readable medium and connectable to the Internet for providing map images to users through the Internet. This computer-implemented code and data comprises: a computer-implemented web crawler configured to gather information from the other servers through the Internet; a computer-implemented search engine configured to search the information gathered by the web crawler for geographical data, and retrieves establishment information items including names of establishments and business information relating to the establishments respectively in association with the addresses of the establishments on the basis of the geographical data; a database of the establishment information items and the addresses of the establishments in association with each other; a computer-implemented establishment image generation unit configured to generate a visual indication indicative of an establishment on the basis of the establishment information relating to this establishment retrieved from the database, and a computer-implemented map image provision unit configured to provide to a user, in response to a request message received from a user terminal through the Internet together with geographical data, a map image representing an area near the location indicated by the geographical data transmitted from the user terminal with the visual indication superimposed on the map image in the location indicated by the geographical data transmitted from the user terminal.

In accordance with a further aspect of the present invention, a method of generating map images and providing the map images to users through the Internet comprising the steps of: receiving a request for a map image from a user together with geographical data; retrieving a map image of the area indicated by the geographical data from a web map server available through the Internet; searching for establishment information items in association with addresses which are located in the map image, by the use of an Internet search engine; superimposing a visual indication indicative of the establishment corresponding to an establishment information item in a position on the map image corresponding to the address of this establishment; and displaying the map image to the user together with the visual indication superimposed on the map image.

In accordance with a still further aspect of the present invention, a three-dimensional map image generation apparatus comprising: a map image storing unit configured to store map images; a location information storing unit configured to store address information items indicative of the addresses of buildings and location information items indicative of the locations corresponding to the addresses of buildings in the map images in association with each other; an address information acquisition unit configured to acquire the address information items of the same building; a storey information extracting unit configured to extract storey information items from the acquired address information items; a storey determination unit configured to determine the highest storey of the same building on the basis of the storey information items extracted by the storey information extracting unit; a stereoscopic image generation unit configured to generate a stereoscopic image having the height corresponding to the determined highest storey, and arrange the generated stereoscopic image in the location which is specified by the location information item associated with the address information items of the same building.

In a preferred embodiment, a two-dimensional map image is provided near the location indicated by the geographical data transmitted from the user terminal, and a three-dimensional map image representing a portion of the two-dimensional map image is provided in response to an operation performed by the user with reference to the two-dimensional map image, wherein the visual indication is superimposed at least on the three-dimensional map image.

In a preferred embodiment, when the geographical data is received together with orientation information, the map image which is viewed in this orientation is provided.

In a preferred embodiment, the orientation information is obtained by a GPS receiver provided in the user terminal on the basis of the results of the GPS measurement along the user's path.

In a preferred embodiment, the orientation information is obtained by comparing an image taken by a camera provided in the user terminal with street-level views which are acquired from a web map service.

In a preferred embodiment, the orientation information is obtained by an electronic compass chip equipped in the user terminal.

In a preferred embodiment, a visual indication indicative of a building, in which an establishment is located, is superimposed on the map image in correspondence with the address of this establishment on the basis of the address information item containing the address of this establishment, and wherein the visual indication indicative of this establishment is superimposed on the visual indication indicative of the building.

In a preferred embodiment, when the visual indication indicative of the building is superimposed on the map image, storey information indicative of stories is extracted from the address information items; stereoscopic images are generated as the visual indications indicative of buildings on the basis of the extracted storey information; and the stereoscopic images are superimposed on the map image.

In a preferred embodiment, when the stereoscopic images are generated, a columnar image is generated as the stereoscopic image having a height determined with reference to the extracted storey information; and the columnar image is partitioned into blocks in order that each storey indicated by the extracted storey information is associated with one of the blocks.

In a preferred embodiment, the visual indication indicative of each establishment is superimposed on the block in the map image associated with the establishment.

In a preferred embodiment, when the stereoscopic images are generated, street-level views are acquired from a web map service in correspondence with the address of the establishment; the street-level views is analyzed to extract therefrom an image of a building; and a stereoscopic image is generated corresponding to the extracted image of the building.

In a preferred embodiment, when the establishment information is retrieved, information items relating to establishments operating solely via the Internet are excluded from the establishment information items to be retrieved.

In a preferred embodiment, when the stereoscopic images are generated, the stereoscopic image is generated by determining the highest storey among the stories of the extracted storey information as the highest storey of the building.

In a preferred embodiment, it is determined whether or not the extracted storey information indicates an underground storey; and when the extracted storey information indicates at least one underground storey, a stereoscopic image which represents the underground part of the building having the underground height is generated in accordance with the storey which is lowest among the stories of the extracted storey information and considered as the lowest storey of the building; and the generated stereoscopic image are superimposed on the map image in correspondence with the address of the building.

In a preferred embodiment, when the establishment information is retrieved, a plurality of address information items corresponding to the same building are extracted.

In a preferred embodiment, the extracted storey information items are classified into groups according to the stories as indicated; the number of the groups of the classified storey information items are counted; the generated stereoscopic image is partitioned into a number of blocks no fewer than the counted number; and the stories indicated by the extracted storey information items are assigned to the partitioned blocks respectively.

In a preferred embodiment, the attribute of each establishment is determined by referring to the establishment information associated with the address of the establishment; and the determined attribute of the establishment is associated with the establishment image for representing the establishment in the map image, when a stereoscopic image is generated, the establishment image associated with the identification information of the establishment is attached to the block assigned to the storey corresponding to the establishment information.

In a preferred embodiment, different establishment images are associated with different establishments in accordance with the attributes of the establishments.

In a preferred embodiment, it is determined whether or not there is a plurality of establishments in the same storey by referring to the extracted storey information items; the block associated with the storey which is determined as including a plurality of establishments is partitioned into small spaces; and when a stereoscopic image is generated, the establishment images of the plurality of establishments located in the determined storey are arranged to the partitioned small spaces respectively.

In a preferred embodiment, in the step of extracting storey information indicative of stories from the address information items, when storey information cannot be extracted in association with the particular address, a stereoscopic image representing a one-floor building is generated, and the generated stereoscopic image is superimposed on the map image in the location specified by the particular address.

In a preferred embodiment, when a stereoscopic image is generated, one stereoscopic image having the height corresponding to one storey is generated, and the generated stereoscopic image is partitioned into a plurality of blocks.

BRIEF DESCRIPTION OF THE DRAWINGS

The objects and features of the present invention will become more apparent from consideration of the following detailed description taken in conjunction with the accompanying drawings in which:

FIG. 2 is a schematic diagram for showing the configuration of a three-dimensional map image generation apparatus in accordance with the embodiment 1.

FIG. 5 is a view showing one example of the data structure stored in an address information storing unit in accordance with the embodiment 1.

FIG. 11 is view showing an example of one example of the data structure stored in an address information storing unit in accordance with an embodiment 3.

FIG. 15 is a schematic diagram for showing the configuration of a three-dimensional map image generation apparatus in accordance with an embodiment 5.

FIG. 17 is a schematic diagram for showing a typical usage situation for the web server shown in FIG. 16.

DESCRIPTION OF THE PREFERRED EMBODIMENTS

Embodiment 1

Figures 1, 3:
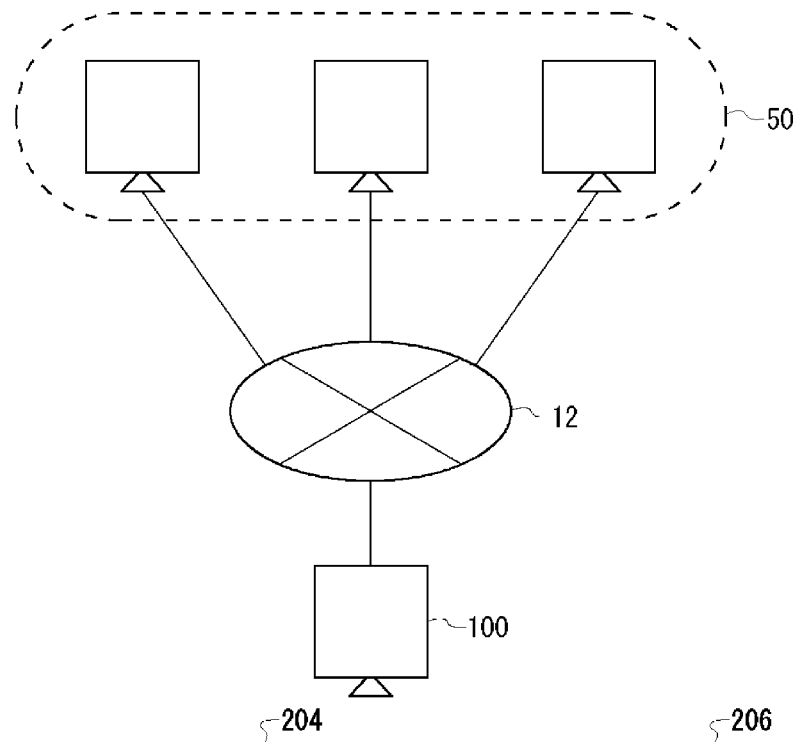
FIG. 1 is a schematic diagram for showing the configuration of a three-dimensional map image generation system in accordance with an embodiment 1.
FIG. 3 is a view showing one example of the data structure stored in a location information storing unit in accordance with the embodiment 1.

FIG. 1 is a schematic diagram for showing the configuration of a three-dimensional map image generation system in accordance with the embodiment 1. The three-dimensional map image generation system 10 of the embodiment 1 serves to generate a three-dimensional map image including stereoscopic images such as columnar images representing office buildings, dome buildings, spherical constructions and so forth by making use of the information contained in Web pages, messages and comments written in electronic bulletin boards, weblogs, email and any other types of information which can be obtained through the Internet. For the sake of clarity in explanation, a Web page, as the term is used herein, is to be broadly interpreted to include any types of these information sources. Also, the term "columnar image" is used herein to represent polygonal columns such as a square column, cylindrical columns and any other columnar shapes. Incidentally, there are a variety of types of content which can be used for this purpose in Web pages. A Web page may contain text, image, video, audio, or any other information types. In what follows, the three-dimensional map image is generated by arranging columnar images in a map for the purpose of explanation. Alternatively, stereoscopic images of any other shape may be generated in accordance with the shapes of buildings, such as dome-like buildings, pyramid-like buildings and so forth.

The three-dimensional map image generation system 10 includes a three-dimensional map image generation apparatus 100 which can be implemented as a server computer in which is installed, for example, with a scenery computer graphics program for making it possible to freely change the viewpoint in the virtual three-dimensional space. The three-dimensional map image generation system 10 may be implemented on the basis of Web3D such as X3D. A three-dimensional columnar image represents a virtual building. It is also possible to arrange virtual shops and so forth in the virtual building to form a virtual shopping mall.

The three-dimensional map image generation system 10 is implemented with the three-dimensional map image generation apparatus 100 connected to web servers 50 through a communication network 12 which is the Internet in practice. The three-dimensional map image generation apparatus 100 and web servers 50 can be implemented with personal computers. The communication network 12 includes WAN (Wide Area Network), LAN (Local Area Network) connected to the Internet, and any other communication networks which are connected to the Internet and based on TCP/IP (Transmission Control Protocol/Internet Protocol).

The web servers 50 serves to publicize a variety of content items of web sites through the communication network 12. In the case where a web site publicizing content is provided by a shop (brick-and-mortar), the content includes information about the address of the shop, the name of the building in which the shop is located as a tenant, the retail goods or service the shop are selling, and so forth. In this description, the term "establishment information" as used herein refers, but is not limited, to the names of the establishments (for example, retail shops, cafes, restaurants, banks and other commercial establishments), the commodities and/or services handled by the establishments, the addresses of the establishments, the outlines of the establishments, messages and comments written in electronic bulletin boards and weblogs relating to the establishments and so forth.

The three-dimensional map image generation apparatus 100 to be described below in detail serves to generate columnar images, which represent establishments and buildings in which the establishments are located, on the basis of the content described in web sites. The three-dimensional map image generation apparatus 100 arranges the generated columnar images on the three-dimensional map image. By this process, the three-dimensional map image can be generated with the columnar image to represent therein establishments and buildings in which the establishments are located.

FIG. 2 is a schematic diagram for showing the configuration of the three-dimensional map image generation apparatus 100 in accordance with the embodiment 1. The three-dimensional map image generation apparatus 100 is provided with a control unit 110, a display unit 190, a map image storing unit 102, a location information storing unit 104, a content storing unit 106 and an address information storing unit 108. The control unit 110 in turn is provided with a gathering unit 120, an address information acquisition unit 122, a storey information extracting unit 124, a storey determination unit 150, an attribute determination unit 126, an establishment image association unit 128, a partitioning unit 160, an assignment unit 130, and a stereoscopic image generation unit 132. The partitioning unit 160 is provided further with a count unit 162.

These units are implemented as program modules which can be run by an arbitrary computer having a CPU (Central Processing Unit), a memory and any other necessary hardware. Accordingly, those skilled in the art will appreciate that there are a variety of hardware configurations including hardware and software in combination.

The map image storing unit 102 serves to store map images. The three-dimensional map image generation apparatus 100 acquires map images provided by Geographical Survey Institute or any other appropriate map image provider, and stores the map images in the map image storing unit 102. The map images represents, for example, Japanese maps in which is given the coordinate system of the real world, for example, latitude and longitude data. In other words, the respective locations on the map image are associated with the degrees of latitude and longitude in correspondence with the locations of the real world.

The location information storing unit 104 serves to store the address information of the respective buildings and the location information indicative of the locations corresponding to the addresses in the map images in association with each other. The address information stored in the location information storing unit 104 is a collection of the addresses which are used in the real world. This address information contains addresses fully including block and house numbers, such as "X-X" in order to uniquely identify the building located in the address indicated by the address information. For example, the location information storing unit 104 may store an item of address information, "1-1, 1-chome, Chuou-cho, Kagoshima-shi, Kagoshima-ken". This address information can be generated on the basis of an address list which can be obtained from a web site of a telephone address information provider, a postal service provider, a map data provider and so forth. Meanwhile, the specific data structure of the address and location information stored in the location information storing unit 104 will be described later.

The degrees of latitude and longitude in correspondence with the points of the real world can be used as the location information given to the map images. In this case, the three-dimensional map image generation apparatus 100 may generate the correspondence data between the address information and the degrees of latitude and longitude by the use of a web service which provides the correspondence information between each address information and the degrees of latitude and longitude corresponding thereto. For example, this web service may provide "latitude 31°36', longitude 130°31' through the communication network 12 in correspondence with the address information "1-1, 1-chome, Chuou-cho, Kagoshima-shi, Kagoshima-ken". By this configuration, the three-dimensional map image generation apparatus 100 can determine the location of an establishment in the map image by referring to the degrees of latitude and longitude corresponding to the address of the establishment stored in the location information storing unit 104.

The gathering unit 120 serves to gather content publicized by web sites through the communication network 12, and store the content in the three-dimensional map image generation apparatus 100 on a regular or irregular base. The gathering unit 120 is a so-called web robot or web crawler which is a program or automated script which browses the Internet and gathers as many resources as possible from a huge number of web sites by automatically and recursively visiting the web sites through hyperlinks and downloading information from the visited web sites in a methodical, automated manner. The content collected by the gathering unit 120 is stored in the content storing unit 106 to be described below.

The content storing unit 106 stores the content gathered by the gathering unit 120 in order that the content items of each web site are associated with each other. For example, if a web site has publicized a content item indicative of the name of the establishment of a shop, a content item indicative of the commodities and/or services handled by the shop, a content item indicative of the address of the establishment, and so forth, these content items are associated with each other.

The address information acquisition unit 122 acquires the address information items which are associated with the same building from the content storing unit 106. More specifically speaking, the address information acquisition unit 122 refers to the address information contained in the content items acquired from web sites through the communication network 12, determines address information items in the content items as the address information items associated with the same building, and extracts these address information items from the content storing unit 106.

In practice, the address information acquisition unit 122 searches the content storing unit 106 with an address information item stored in the location information storing unit 104 as a keyword phrase, and acquire the address information items including the keyword phrase. The keyword phrase corresponds to a geographical address which is specified only to the level of house number and acquired by removing the building information from the address information. For example, in the case where an item of address information, "1-1, 1-chome, Chuou-cho, Kagoshima-shi, Kagoshima-ken" is set as a keyword phrase, additional items of address information may include " Bldg. 2nd floor, 1-1, 1-chome, Chuou-cho, Kagoshima-shi, Kagoshima-ken", " Bldg. 4-th floor, 1-1, 1-chome, Chuou-cho, Kagoshima-shi, Kagoshima-ken", and the like. The address information acquisition unit 122 acquires these additional items of address information.

The address information item of " Bldg. 4-th floor, 1-1, 1-chome, Chuou-cho, Kagoshima-shi, Kagoshima-ken" may be acquired from, for example, a message that "meeting is arranged for 10th October at 20 o'clock at " Bldg. 4-th floor, 1-1, 1-chome, Chuou-cho, Kagoshima-shi, Kagoshima-ken" which is stored in the content storing unit 106. Namely, irrespective of the subject matter of the content, the source of the information and whether or not it is true, all items of the address information acquisition unit are acquired catch-as-catch-can as long as the keyword phrase is included. This is because what is needed is the storey information of the building. Incidentally, the address information items as acquired commonly represent the same building, i.e., "** Bldg". The address information storing unit 108 stores the address information items which are acquired by the address information acquisition unit 122.

The attribute determination unit 126 determines the attribute of each establishment by extracting the establishment information associated with the corresponding address information item which is acquired from the content storing unit 106 by the address information acquisition unit 122. The three-dimensional map image generation apparatus 100 is provided with an attribute information storing unit in advance (not shown in the figure) in which the attribute information such as "hairdressing" is stored in association with the keyword phrase corresponding thereto such as "hair", "shampoo", "haircut" and so forth.

The attribute determination unit 126 extracts keywords or keyword phrases contained in the establishment information to identify the attribute of the establishment. Specifically speaking, the attribute determination unit 126 extracts a keyword(s) in the form of a noun from the establishment information, for example, "hair", "shampoo" or the like. Then, the attribute determination unit 126 searches the attribute information by the use of the keyword(s) to retrieves the relevant attribute information item and identify the attribute of the establishment. When a plurality of attributes are identified in association with the keyword phrase corresponding to the same establishment, one of the attributes is selected as the attribute of this establishment by determining the attribute associated with the largest number of the attribute information items among the plurality of attributes.

The establishment image association unit 128 serves to associate the identified attribute of the establishment with an image (hereinafter referred to as "establishment image") which is used to represent this establishment on the map image. The address information storing unit 108 stores the correspondence relationship information between the establishment image and the attribute information of each establishment. Meanwhile, the establishment image used in the embodiment 1 is the same monochromic image (for example, a white image) irrespective of the attribute.

The address information storing unit 108 serves to store the address information acquired by the address information acquisition unit 122, and the information on each establishment such as the name of the establishment. Specifically, the address information storing unit 108 is provided with a database for storing the address information of each establishment, the name of the establishment associated with this address information, the name of the building including the establishment, the URL (Uniform Resource Locator) of the web site containing the address information, and the like. The address information storing unit 108 further stores the attribute information about the attribute of the establishment and the establishment images. Meanwhile, the specific data structure of the information stored in the address information storing unit 108 will be described later.

The storey information extracting unit 124 extracts the storey information indicative of a storey from the address information acquired by the address information acquisition unit 122. For example, if the address information is "** Bldg. 2nd floor, 1-1, 1-chome, Chuou-cho, Kagoshima-shi, Kagoshima-ken", "2nd floor" is extracted as the storey information. Needless to say, the "2nd floor" indicates the 2nd floor above the level of the ground.

The storey determination unit 150 determines the highest storey, i.e. the number of stories of the building on the basis of the storey information extracted by the storey information extracting unit 124. Meanwhile, in the case where a plurality of stories are extracted by the storey information extracting section 124, the storey determination unit 150 determines the number of stories of the building on the basis of the highest storey. For example, if the storey information extracting section 124 extracts, as the storey information, "2nd floor", "4th floor", "10th floor" and "12th floor", the storey determination unit 150 determines "12th floor" as the highest storey of the building.

The stereoscopic image generation unit 132 generates a stereoscopic image such as a columnar image in accordance with the highest storey which is determined by the storey determination unit 150. The stereoscopic image generation unit 132 generates a monochromic columnar image of a gray color in accordance with the highest storey, that is, "12th floor". For example, the stereoscopic image generation unit 132 generates a columnar image having a height of 120 pixels in correspondence with "12th floor". Alternatively, the number of pixels in the vertical direction may be adjusted in accordance with the resolution of the display. The correspondence relationship between the highest storey and the number of pixels representing the height of the highest storey may be stored in a database (not shown in the figure) provided in the three-dimensional map image generation apparatus 100. In this case, the correspondence relationship is prepared in order that the number of pixels increases as the highest storey becomes high. On the other hand, if the height of the building is directly described in the address information, the stereoscopic image generation unit 132 generates a columnar image in accordance with this height.

The stereoscopic image generation unit 132 arranges the generated columnar image in the location which is specified by the location information in association with the address information by referring to the map image storing unit 102 and the location information storing unit 104. Specifically, for example, if the address information is "1-1, 1-chome, Chuou-cho, Kagoshima-shi, Kagoshima-ken", the stereoscopic image generation unit 132 arranges the generated columnar image in the location which is specified by the location information of the map image in correspondence with the degrees of latitude and longitude associated with the address information, i.e., "latitude 31°36', longitude 130°31'.

Incidentally, if a columnar image has already been arranged in the location corresponding to the degrees of latitude and longitude associated with the address information, the stereoscopic image generation unit 132 deletes this previously arranged columnar image, and then arranges the columnar image generated anew in the location. On the other hand, the stereoscopic image generation unit 132 may simply adjust the height of the previously arranged columnar image, rather than replace it with the new columnar image. In this case, for example, if storey information indicative of a higher storey is collected by gathering new content, a columnar image representing a higher building is to be arranged so that the height of the columnar image is increased.

The partitioning unit 160 is provided further with a count unit 162 as described above. The count unit 162 classifies the storey information items extracted by the storey information extracting section 124 into groups according to the storey, and counts the number of these groups. The partitioning unit 160 partitions the columnar image generated by the stereoscopic image generation unit 132 into a number of blocks no fewer than the number counted by the count unit 162. In this description, the term "block" is used to represent a rectangular area (cubic space) in which an establishment image can be attached thereto as described later in detail.

If the storey information extracting section 124 extracts, as the storey information, "2nd floor", "4th floor", "10th floor" and "12th floor", these four storey information items are classified into four groups. In this case, the columnar image generated by the stereoscopic image generation unit 132 is partitioned into four or more blocks.

On the other hand, if the storey information items extracted by the storey information extracting section 124 include a plurality of storey information items indicative of the same storey, the plurality of storey information are classified into a single group. For example, if the storey information extracting section 124 extracts, as the storey information, "2nd floor", "2nd floor", "10th floor" and "12th floor", these four storey information items are classified into three groups, i.e., a first group consisting of "2nd floor", a second group consisting of "10th floor", and a third group consisting of "12th floor". In this case, the columnar image generated by the stereoscopic image generation unit 132 is partitioned into three or more blocks.

The assignment unit 130 assigns the stories indicated by the storey information items extracted by the storey information extracting section 124 to the blocks partitioned by the partitioning unit 160 respectively. For example, the assignment unit 130 assigns, to the four block partitioned by the partitioning unit 160, the stories corresponding to the storey information extracted by the storey information extracting section 124 respectively in ascending order from the lower storey to the upper storey, for example, "2nd floor", "4th floor", "10th floor" and "12th floor". The assigned relationship between the blocks and the stories generated by the assignment unit 130 may be stored in the three-dimensional map image generation apparatus 100.

The stereoscopic image generation unit 132 as described above attaches the establishment image associated with the identification information of the establishment to the block corresponding to the establishment information. Specifically speaking, for example, if the address information acquisition unit 122 acquires "** Bldg. 2nd floor, 1-1, 1-chome, Chuou-cho, Kagoshima-shi, Kagoshima-ken" as the address information of an establishment "ABC", the stereoscopic image generation unit 132 attaches the establishment image associated with the identification information of "ABC" to the block corresponding to "2nd floor".

The display unit 190 includes a screen for displaying to the user a map image containing the columnar image to which the establishment image is attached by the stereoscopic image generation unit 132. In this manner, a columnar image can be generated with an establishment image attached thereto if available. By displaying the establishment image attached to the columnar image representing a building, it is possible to notify the user that the establishment exists in the building in the real world. Of course, when no establishment image is available, a monochromic image of a gray color is displayed as it is without an establishment image to be attached to the columnar image.

FIG. 3 shows one example of the data structure stored in the location information storing unit in accordance with the embodiment 1. This location information storing unit 104 is used to store the correspondence relationship between the address information indicative of the address of each building and the location information indicative of the location of this building in the map image which is specified by the address information. This data structure includes an address ID field 202, an address information field 204, and a location information field 206. The address ID field 202 is used to store addresses ID for uniquely identifying the address information for the respective buildings. The address information field 204 is used to store the addresses which are used in the real world in association with the addresses ID. The location information field 206 is used to store the degrees of latitude and longitude of the real world in association with the addresses ID.

For example, the entry 210 which is encircled with broken line indicates that the address information "1-1, 1-chome, Chuou-cho, Kagoshima-shi, Kagoshima-ken" is associated with an address ID "IDKA0001". Furthermore, the entry 210 indicates that the address information is associated with "latitude 31°36', longitude 130°31' as the location in the real world as specified by the address information. In other words, the three-dimensional map image generation apparatus 100 can determine the location in the map image corresponding to the address information by referring to the degrees of latitude and longitude associated with the address information.

Figure 4:
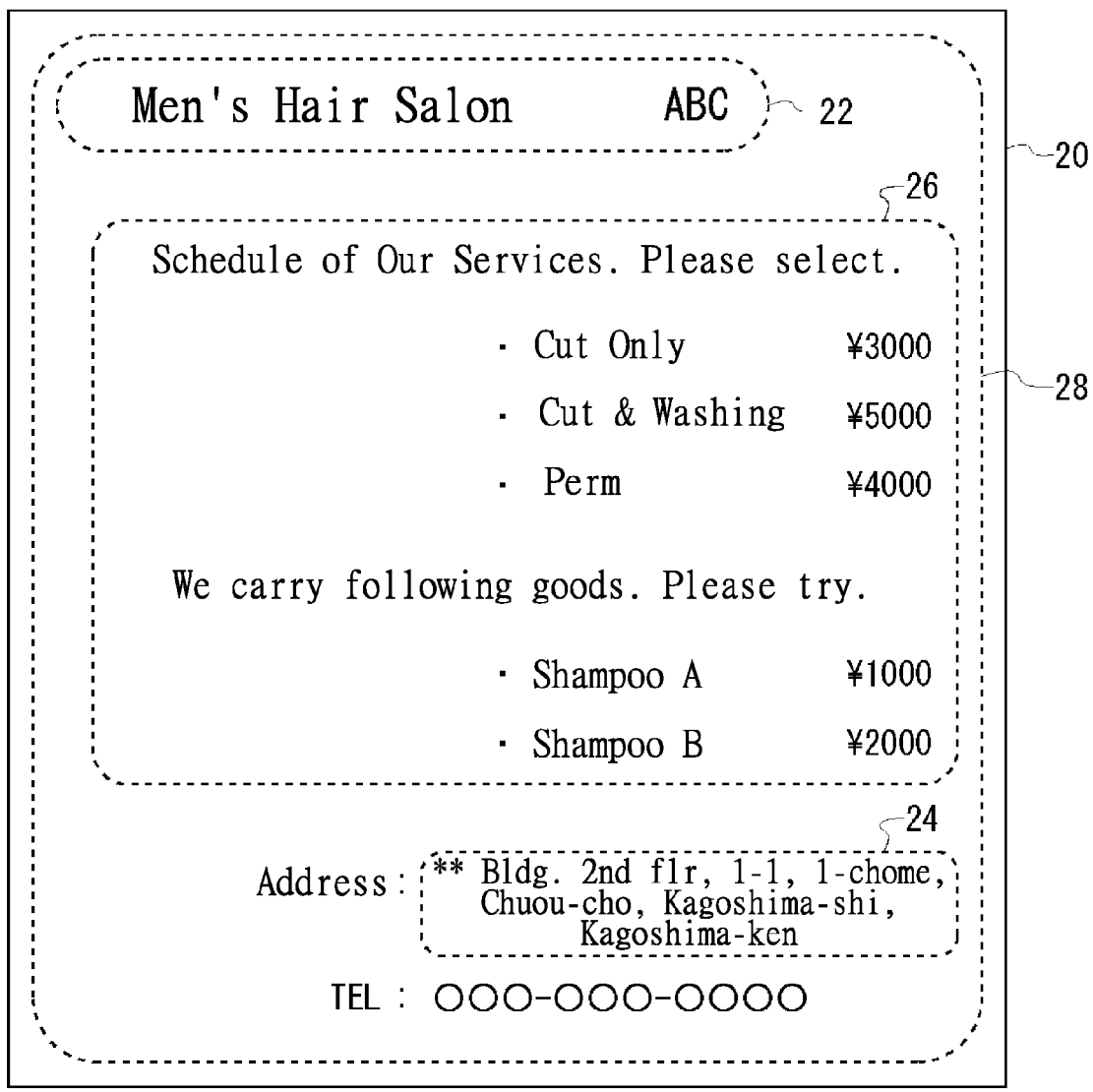
FIG. 4 is a view showing one example of a web site provided in a web server in accordance with the embodiment 1.

FIG. 4 shows one example of a web site provided in a web server. The content 28 which is publicized by the web site 20 as illustrated in FIG. 4 includes a content item 22 indicative of the name of the establishment, i.e., the name of a shop "ABC", the content item 26 indicative of the list of services and commodities which can be handled by the establishment, a content item 24 indicative of the address information, i.e., the address of the establishment, and so forth. The content 28 provided by the web site is acquired by the gathering unit 120 through the communication network 12 shown in FIG. 1, and stored in the content storing unit 106 as content items in association with each other.

FIG. 5 shows one example of the data structure stored in the address information storing unit in accordance with the embodiment 1. This address information storing unit 108 serves to store address information acquired by the address information acquisition unit 122, and the like. The address information storing unit 108 as illustrated in FIG. 5 includes an establishment ID field 212, an establishment name field 214, an address information field 216 and a building name field 218, a URL field 220, an attribute information field 222 and an establishment image name field 224.

The establishment ID field 212 is used to store identification numbers, i.e., establishment IDs, for uniquely identifying the establishment. The address information field 216 and the establishment name field 214 are used to store the address and name of the establishment acquired by the address information acquisition unit 122 in correspondence with each establishment ID. The building name field 218 is used to store the name of a building contained in the address information in correspondence with each establishment ID. As shown in FIG. 5, the same name may be written in different entries to represent the same building in which a plurality of establishments are installed. The URL field 220 is used to store the URL of the web site from which the address information and the names of the establishment have been collected in correspondence with each establishment ID.

The attribute information field 222 is used to store the attribute information indicative of the attribute of the establishment in correspondence with each establishment ID. The establishment image name field 224 is used to store the name of an establishment image which can be used to represent the establishment in the map image in correspondence with each establishment ID. Incidentally, in the embodiment 1 as described above, the same image name, i.e., "establishment image A", is store in the establishment image name field 224 irrespective of the attribute of the establishment.

For example, the entry 230 is given "0001" as the establishment ID, "ABC" as the name of the establishment, and " Bldg. 2nd floor, 1-1, 1-chome, Chuou-cho, Kagoshima-shi, Kagoshima-ken" as the address information of the establishment. Furthermore, the entry 230 is given " Bldg" as the name of the building including the establishment "ABC", and "http://abc . . . " as the URL of the web site from which the address information and the names of the establishment have been collected. Still further, the entry 230 is given "barber shop" as the attribute of the establishment "ABC", and "establishment image A" as the name of the establishment image to represent the establishment on the map image.

Figure 6A:
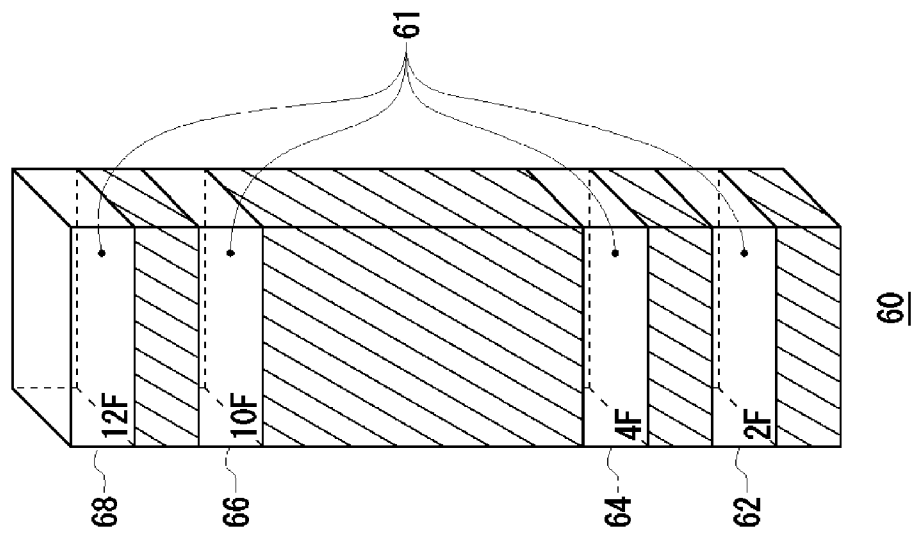
FIG. 6A is a schematic diagram for showing a first example of the columnar image in accordance with the embodiment 1.
Figure 6B:
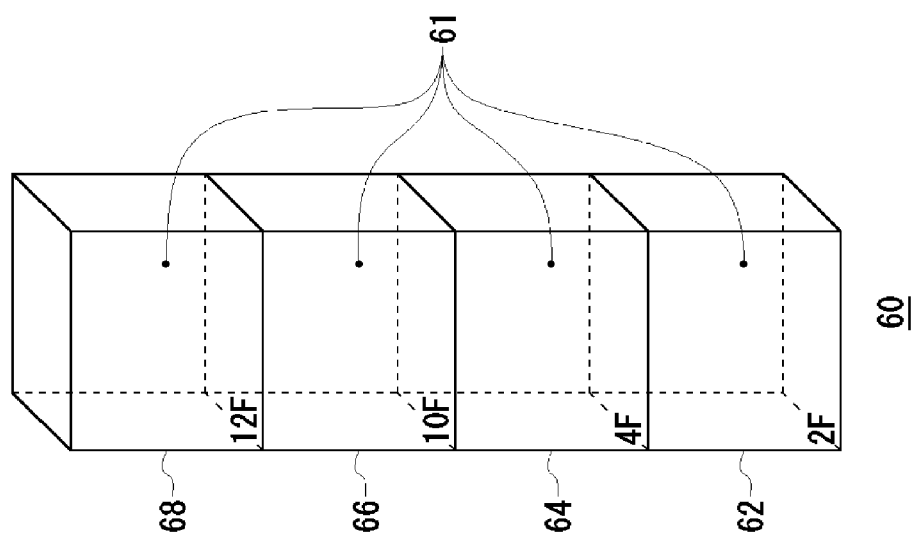
FIG. 6B is a schematic diagram for showing a second example of the columnar image in accordance with the embodiment 1.

FIG. 6A is a schematic diagram for showing a first example of the columnar image. On the other hand, FIG. 6B is a schematic diagram for showing a second example of the columnar image. Reference numeral 61 indicates the areas, in which establishment images are attached, or establishment images as they are for the sake of convenience. Specifically, FIG. 6A and FIG. 6B show the columnar images which are generated by the use of the data structure shown in FIG. 5. Namely, each of FIG. 6A and FIG. 6B shows an example of the columnar image generated in the case where the storey information extracting section 124 shown in FIG. 2 extracts the storey information containing the stories "2nd floor", "4th floor", "10th floor" and "12th floor".

As shown in FIG. 6A and FIG. 6B, the columnar image generated by the stereoscopic image generation unit 132 is partitioned by the partitioning unit 160 into a plurality of blocks in a multilevel structure. The difference between the columnar image shown in FIG. 6A and the columnar image shown in FIG. 6B is the number of partition blocks.

The columnar image shown in FIG. 6A includes as many partition blocks as are counted by the count unit 162. First, since the storey information extracting section 124 shown in FIG. 2 extracts the storey information including four stories "2nd floor", "4th floor", "10th floor" and "12th floor". there are four groups of the storey information. Because of this, as shown in FIG. 6A, the columnar image is partitioned by the partitioning unit 160 into four blocks. These four blocks are given storey information items which are assigned by the assignment unit 130 from the lower storey to the upper storey in ascending order on the basis of the storey information extracted by the storey information extracting section 124. Namely, the assignment unit 130 assigns "2nd floor" to the first block 62, "4th floor" to the second block 64, "10th floor" to the third block 66 and "12th floor" to the fourth block 68.

The stereoscopic image generation unit 132 attaches the establishment images of the establishments located in the stories "2nd floor", "4th floor", "10th floor" and "12th floor" which are assigned to the four blocks respectively. Namely, the stereoscopic image generation unit 132 attaches the establishment image 61 of the establishment "ABC" to the first block 62, the establishment image 61 of the establishment "DEF" to the second block 64, the establishment image 61 of the establishment "GHI" to the third block 66, and the establishment image 61 of the establishment "JKL" to the fourth block 68. Incidentally, in the case of this example, the establishment images 61 are the same image, i.e., the establishment image A.

On the other hand, the columnar image shown in FIG. 6B includes as many partition blocks as are corresponding to the highest storey determined by the storey determination unit 150. For the sake of clarity in explanation, hatching is applied to the blocks which are not associated with the storey information, and boundary lines are dispensed with. For example, since the storey determination unit 150 determines by the use of the data shown in FIG. 5 that the highest storey is "12th floor", the partitioning unit 160 partitions the columnar image into 12 blocks.

Of the 12 blocks, the four blocks are associated respectively with the stories "2nd floor", "4th floor", "10th floor" and "12th floor" and given the establishment images assigned to the establishments located in the respective stories by the stereoscopic image generation unit 132. Namely, the stereoscopic image generation unit 132 attaches the establishment image 61 of the establishment "ABC" to the first block 62, the establishment image 61 of the establishment "DEF" to the second block 64, the establishment image 61 of the establishment "GHI" to the third block 66, and the establishment image 61 of the establishment "JKL" to the fourth block 68.

Incidentally, no establishment image is attached to the hatched blocks shown in FIG. 6B other than the four blocks to which the establishment image is attached. This is because there is no acquired content containing the address information from which the storey information corresponding to the stories of the hatched blocks could not be extracted. The hatched blocks are just of the columnar image, for example, a monochromic image.

Figure 7:
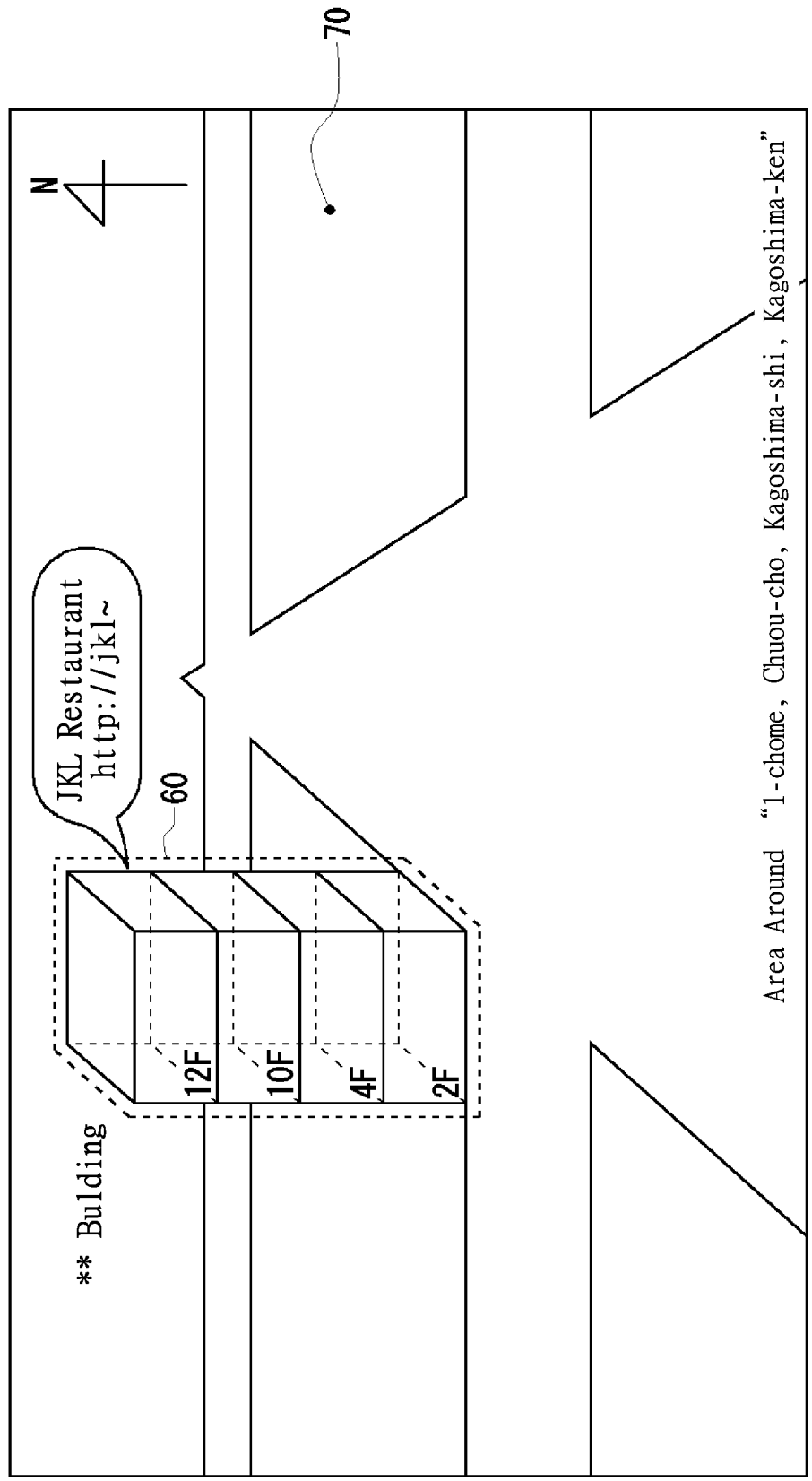
FIG. 7 is a schematic diagram for showing a map image on which a columnar image is arranged with an establishment image attached thereto in accordance with the embodiment 1.

FIG. 7 is a schematic diagram for showing a map image 70 on which the columnar image is arranged with the establishment image attached thereto. Specifically describing, the columnar image 60 to which the establishment images of the respective establishments are attached is arranged in the location corresponding to the degrees of latitude and longitude specified on the map image 70 in accordance with the address information of the building including these establishments. The columnar image 60 is arranged, for example, in the rectangular area of a predetermined size centered at the position corresponding to the degrees of latitude and longitude as illustrated in FIG. 7. Alternatively, in the case where the map image stored in the map image storing unit 102 has been partitioned in advance into a plurality of areas, the columnar image can be arranged in an area including the position corresponding to the degrees of latitude and longitude. Furthermore, in the case where a satellite or aerial photographic map taken from the above is available, it is possible to determine the area corresponding to the bottom of the building as identified on the map image, and arrange the columnar image in this area.

Meanwhile, in the vicinity of a block partitioning the columnar image 60 arranged in the map image 70, for example, the block to which "12th floor" has been assigned, the display unit 190 displays a URL of the web site which publicizes content relating to the establishment associated with this block. Alternatively, the display unit 190 may display the information effective to attract more customers to the establishment such as a shop, for example, information about a coupon ticket, an event or the like near this block. The three-dimensional map image generation apparatus 100 can receive a request for accessing the web site from the user (who clicks on the link to the web site), and make the display unit 190 display the web site which publicizes content relating to the establishment. By this configuration, it is possible to lead the user having an interest in the establishment corresponding to the establishment image to the web site provided by this establishment.

Figure 8:
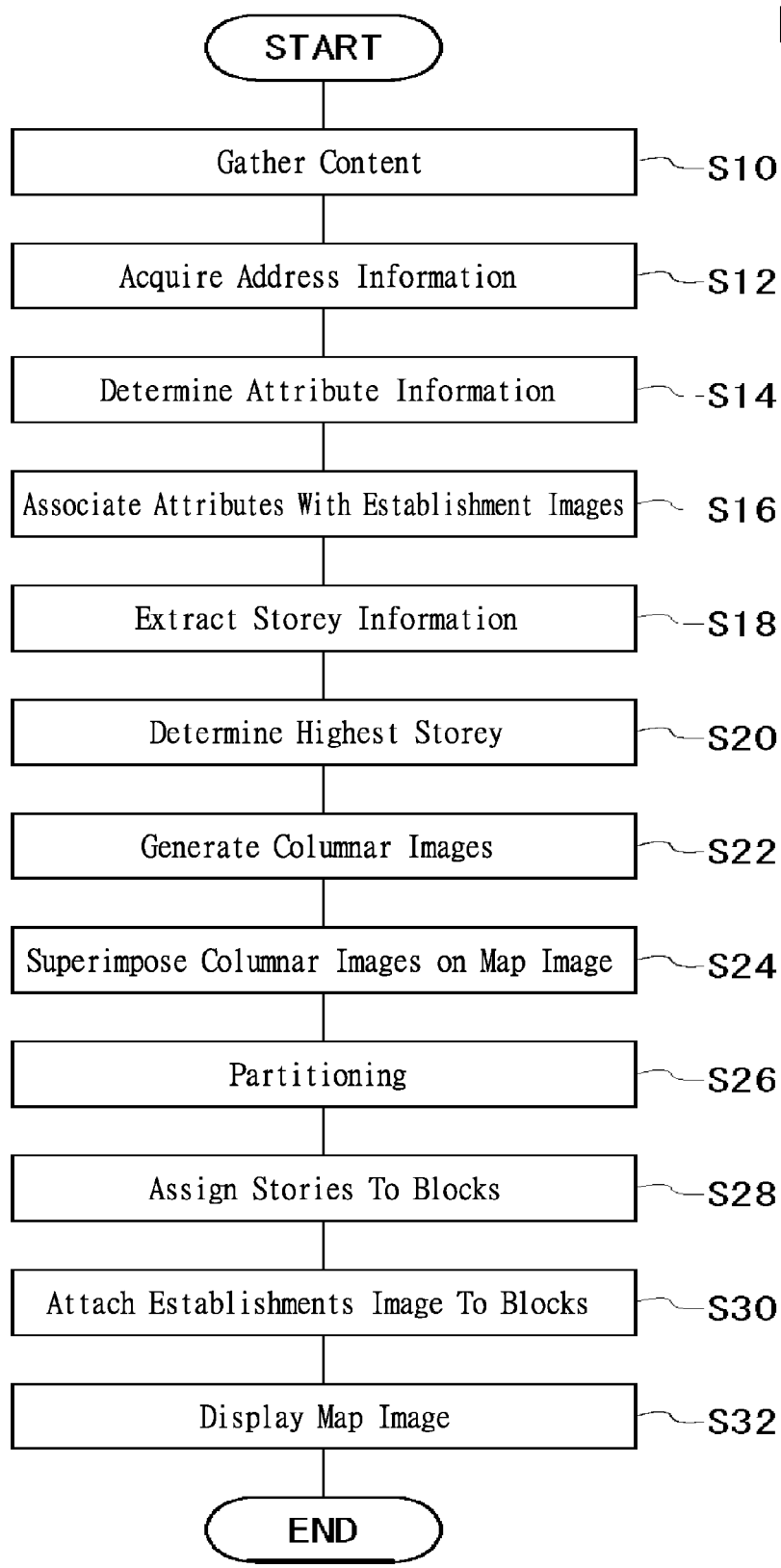
FIG. 8 is a flow chart for showing the process of generating a three-dimensional map image in accordance with the embodiment 1.

FIG. 8 is a flow chart for showing the process of generating a three-dimensional map image in accordance with the embodiment 1. The gathering unit 120 gathers content publicized by web sites through the communication network 12 on a regular or irregular base, for example, once a day in step S10. The content items gathered by the gathering unit 120 are stored in the content storing unit 106.

The address information acquisition unit 122 refers to the address information contained in the content items acquired from web sites through the communication network 12, determines address information items associated with the same building among the address information items contained in the content items, and extracts these determined address information items from the content storing unit 106 in step S12. In practice, the address information acquisition unit 122 sets an address information item stored in the location information storing unit 104 as a keyword phrase, searches the content storing unit 106, and acquire the address information items including the keyword phrase.

For example, in the case where an item of address information, "1-1, 1-chome, Chuou-cho, Kagoshima-shi, Kagoshima-ken" is set as a keyword phrase, additional items of address information may include " Bldg. 2nd floor, 1-1, 1-chome, Chuou-cho, Kagoshima-shi, Kagoshima-ken", " Bldg. 4-th floor, 1-1, 1-chome, Chuou-cho, Kagoshima-shi, Kagoshima-ken", and the like. The address information acquisition unit 122 acquires these additional items of address information corresponding to the same building named "** Bldg". Incidentally, the address information acquired by the address information acquisition unit 122 is stored in the address information storing unit 108.

The attribute determination unit 126 determines the attribute of each establishment by extracting the establishment information associated with the corresponding address information item which is acquired from the content storing unit 106 by the address information acquisition unit 122 in step S14. For example, when a keyword such as "hair", "shampoo" or the like is extracted, the attribute determination unit 126 determines that the attribute of the establishment is "barber shop".

The establishment image association unit 128 associates the determined attribute of the establishment with the establishment image of this establishment in step S16. Specifically, the attribute information "barber shop" indicative of the attribute of the establishment is associated with the establishment image A of this establishment. The address information storing unit 108 stores the correspondence relationship information between the establishment image and the attribute information of each establishment as generated by the establishment image association unit 128.

The storey information extracting unit 124 extracts the storey information indicative of stories from among the address information acquired by the address information acquisition unit 122. For example, if the address information is "** Bldg. 2nd floor, 1-1, 1-chome, Chuou-cho, Kagoshima-shi, Kagoshima-ken", "2nd floor above the level of the ground" is extracted as the storey information in step S18.

The storey determination unit 150 determines the highest storey, i.e. the number of stories of the building on the basis of the storey information extracted by the storey information extracting unit 124 in step S20. For example, if the storey information extracting section 124 extracts, as the storey information, "2nd floor", "4th floor", "10th floor" and "12th floor", the storey determination unit 150 determines "12th floor" as the highest storey of the building.

The stereoscopic image generation unit 132 generates a stereoscopic image, such as a columnar image, in accordance with the highest storey which is determined by the storey determination unit 150. The stereoscopic image generation unit 132 generates a monochromic columnar image of a gray color in accordance with the highest storey, that is, "12th floor" in step S22.

The stereoscopic image generation unit 132 arranges the generated columnar image in the location which is specified by the location information in association with the address information by referring to the map image storing unit 102 and the location information storing unit 104 in step S24. Incidentally, the location information storing unit 104 stores the address information of each building and the location information indicative of the location corresponding to this address in the map image in association with each other. For example, the address information item of "1-1, 1-chome, Chuou-cho, Kagoshima-shi, Kagoshima-ken" is associated with "latitude 31°36', longitude 130°31'" as the location in the map image.

The stereoscopic image generation unit 132 refers to the map image storing unit 102 and the location information storing unit 104, and if the address information is "1-1, 1-chome, Chuou-cho, Kagoshima-shi, Kagoshima-ken", the stereoscopic image generation unit 132 arranges the generated columnar image in the location of the map image in correspondence with the degrees of latitude and longitude associated with the address information, i.e., "latitude 31°36', longitude 130°31'.

The count unit 162 classifies the storey information items extracted by the storey information extracting section 124 into groups according to the storey, and counts the number of these groups. The partitioning unit 160 partitions the columnar image generated by the stereoscopic image generation unit 132 into a number of blocks no fewer than the number counted by the count unit 162 in step S26.

For example, if the storey information extracting section 124 extracts the storey information including four stories "2nd floor", "4th floor", "10th floor" and "12th floor". these four storey information items are classified into four groups by the count unit 162. In this case, the partitioning unit 160 may partition the columnar image generated by the stereoscopic image generation unit 132 into four blocks.

The assignment unit 130 assigns the stories indicated by the storey information items extracted by the storey information extracting section 124 to the blocks partitioned by the partitioning unit 160 respectively in step S28. For example, the assignment unit 130 assigns, to the four block partitioned by the partitioning unit 160, the stories corresponding to the storey information extracted by the storey information extracting section 124 respectively in ascending order from the lower storey to the upper storey, for example, "2nd floor", "4th floor", "10th floor" and "12th floor".

The stereoscopic image generation unit 132 attaches the establishment image associated with the identification information of the establishment to the block corresponding to the establishment information in step S30. Specifically speaking, for example, if the address information acquisition unit 122 acquires "** Bldg. 2nd floor, 1-1, 1-chome, Chuou-cho, Kagoshima-shi, Kagoshima-ken" as the address information of an establishment "ABC", the stereoscopic image generation unit 132 attaches the establishment image associated with the identification information of the establishment "ABC" to the block corresponding to "2nd floor". The map image is displayed to user by the display unit 190 in step S32 with the columnar image to which the establishment image is attached by the stereoscopic image generation unit 132. Incidentally, when no establishment image is available, a monochromic image of a gray color is displayed as it is without an establishment image to be attached to the columnar image.

In accordance with the embodiment 1, the three-dimensional map image can be automatically and easily generated together with columnar images representing buildings in the real world on the basis of the content contained in web sites. Also, the heights of the columnar images can automatically be updated by continuously collecting content. As a result, it is possible to alleviate the burden on the personnel in charge of generating three-dimensional map images. Meanwhile, in regard to the technical concept of the embodiment 1, it is not required to form a virtual world which is perfectly coincident with the real world when the three-dimensional map image is generated with columnar images. In other words, in accordance with the technical concept of the embodiment 1, columnar images are first generated as far as possible on the basis of the contents contained in web sites, and thereafter adjusted in height to conform with the real world. In this context, the technical concept of the embodiment 1 is to provide a first prototype of a three-dimensional map image for personnel in charge of generating a three-dimensional map image.

Embodiment 2

In accordance with the embodiment 1, a columnar image is arranged in the location on the map image which is specified by the location information in association with the address information of the building. However, in accordance with the embodiment 2, a columnar image is arranged in the location below the ground on the map image which is specified by the location information in association with the address information of the building.

Figure 9:
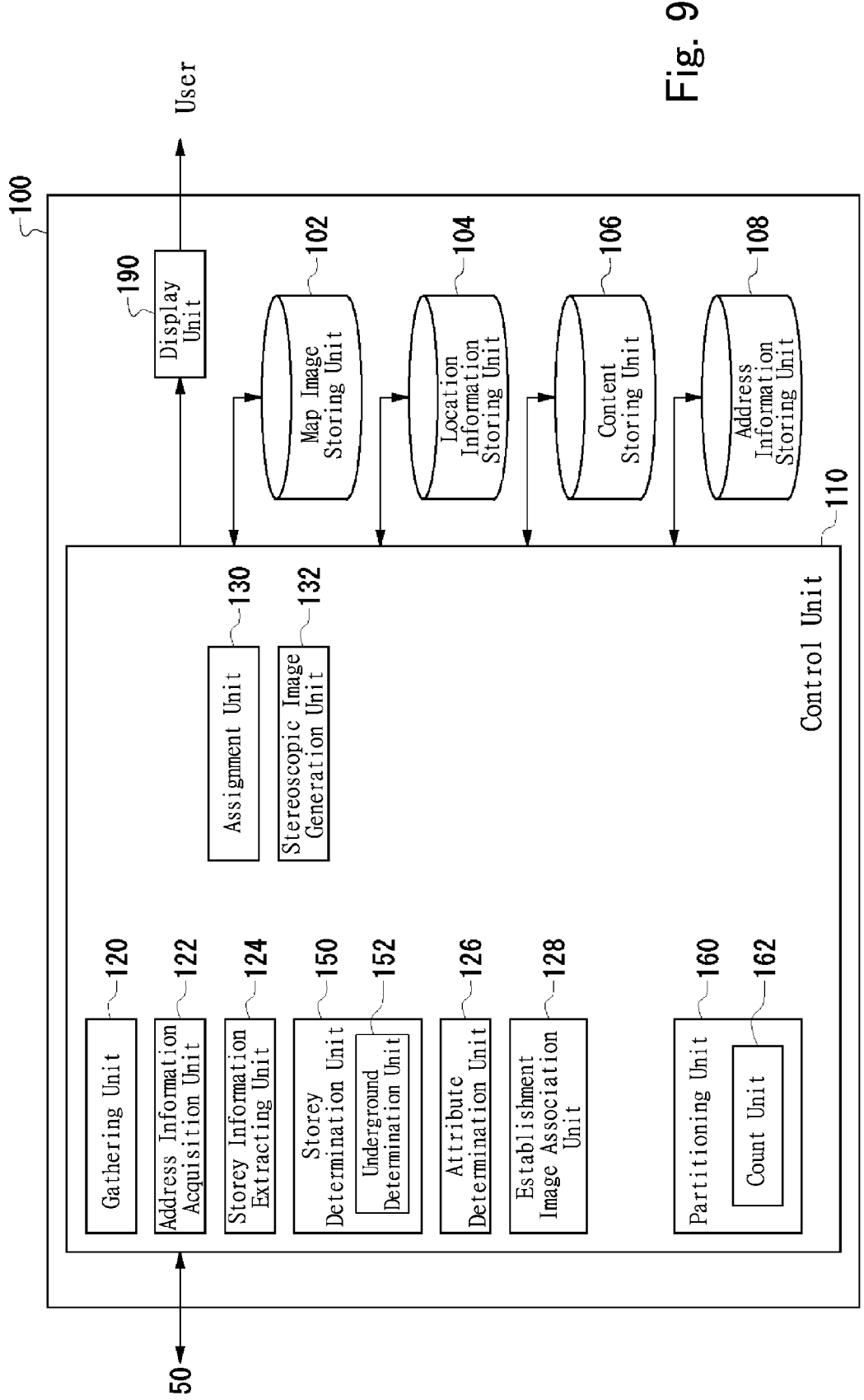
FIG. 9 is a schematic diagram for showing the configuration of a three-dimensional map image generation apparatus in accordance with an embodiment 2.

FIG. 9 is a schematic diagram for showing the configuration of the three-dimensional map image generation apparatus 100 in accordance with the embodiment 2. In FIG. 9, like reference numbers indicate the same elements as illustrated in FIG. 2, and detailed explanation is omitted. While the configuration of the three-dimensional map image generation apparatus 100 in accordance with the embodiment 2 has the similar configuration of the three-dimensional map image generation apparatus 100 as illustrated in FIG. 2, the storey determination unit 150 of the embodiment 2 is provided further with an underground determination unit 152.

The underground determination unit 152 serves to determine whether or not the storey information extracted by the storey information extracting section 124 indicates an underground storey. More specifically speaking, when the underground determination unit 152 determines that one or more storey of a building is an underground storey, the storey determination unit 150 determines, as the lowest storey of the building, the lowest storey among the stories which are determined as underground stories. For example, if the storey information extracting section 124 extracts, as the storey information, "1st basement", "2nd basement", "10th floor" and "12th floor", the storey determination unit 150 determines "2nd basement" as the lowest storey of the building. Incidentally, in this description, the n-th underground storey is referred to as "n-th basement", and the n-th aboveground storey is referred to simply as "n-th floor". The underground determination unit 152 determines whether or not the storey represented by the storey information item is an underground storey in accordance with whether or not the storey information item extracted by the storey information extracting section 124 includes a word, letter or symbol which implies underground such as "B1", "underground".

The stereoscopic image generation unit 132 generates a columnar image in accordance with the lowest storey which is determined by the storey determination unit 150, and provided with the functionality of arranging the generated columnar image in the location below the ground on the map image which is specified by the location information in association with the address information of the building. For example, the stereoscopic image generation unit 132 generates a monochromic image of a gray color having a height of 20 pixels in correspondence with the lowest storey, that is, "2nd basement".

Figure 10:
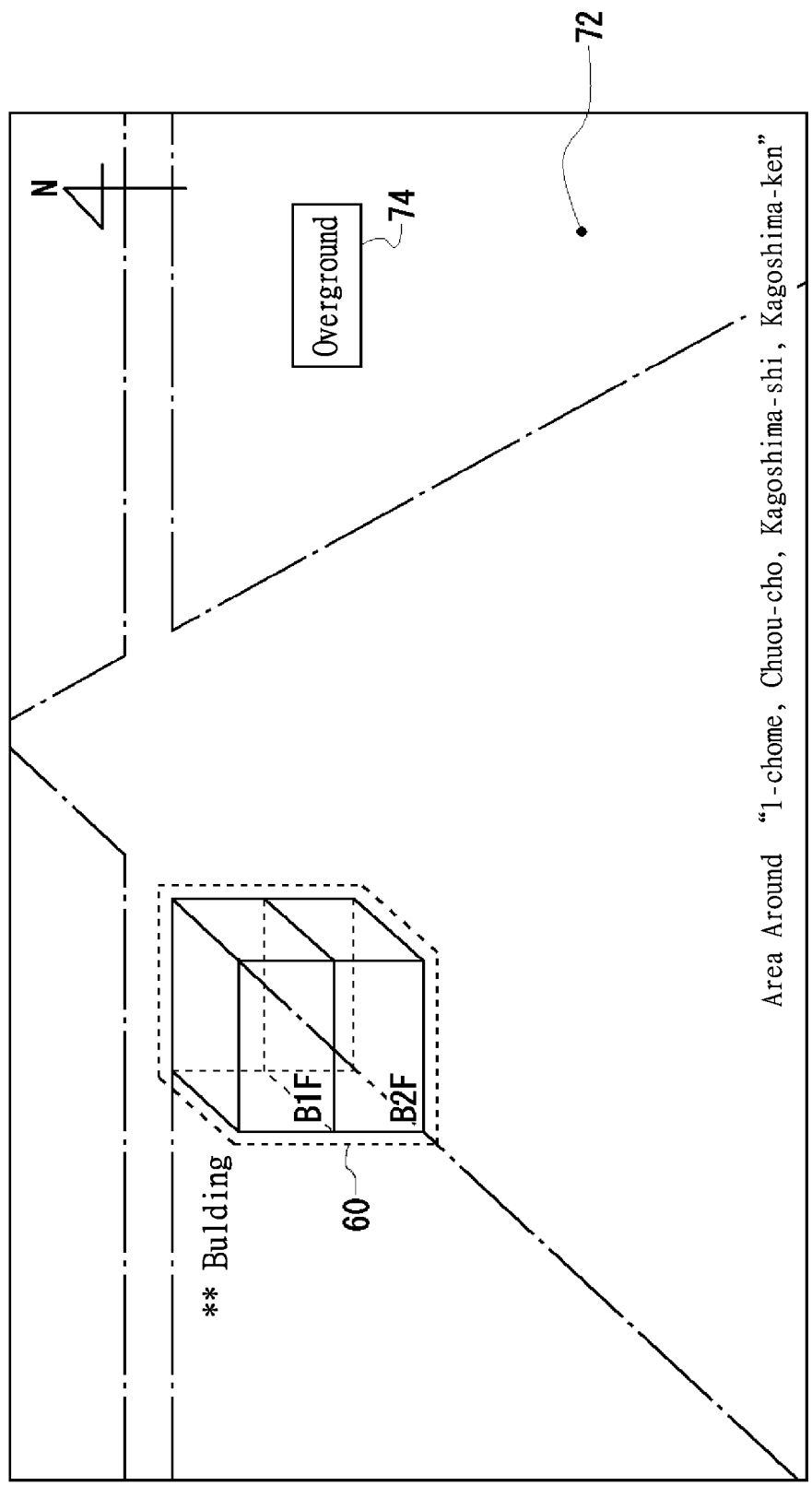
FIG. 10 is a schematic diagram for showing a map image on which a columnar image is arranged with an establishment image attached thereto in the location below the ground in accordance with the embodiment 2.

FIG. 10 is a schematic diagram for showing a map image on which the columnar image is arranged with the establishment image attached thereto in the location below the ground. Specifically describing, the columnar image 60 to which the establishment image is attached by the stereoscopic image generation unit 132 is arranged in the location below the ground corresponding to the degrees of latitude and longitude specified on the map image 72 in accordance with the address information of the building including these establishments. Meanwhile, as illustrated in FIG. 10, the ground-based roads are shown in phantom for the purpose of illustrating in the map image that the columnar image 60 is located under the level of the ground. Furthermore, on the map image 72, the display unit 190 superimposes a switch icon 74 which can be clicked by a user to switch the map image to an aboveground view. When the user presses the switch icon 74 for switching to the aboveground view, the display unit 190 switches the map image to the aboveground view, for example, the map image shown in FIG. 7 with the aboveground columnar image.

In accordance with the embodiment 2, it is possible to create a virtual environment and realistically reproduce the real world by representing in the virtual environment not only the overground part of a real building but also the underground part of the real building.

Embodiment 3

In accordance with the embodiment 1, the same establishment image is attached to the respective blocks irrespective of the establishment. However, in accordance with the embodiment 3, different images are attached to the blocks in accordance with the attribute of the establishment.

While the configuration of the three-dimensional map image generation apparatus 100 in accordance with the embodiment 3 has the similar configuration of the three-dimensional map image generation apparatus 100 as illustrated in FIG. 2, the establishment image association unit 128 of the embodiment 3 is provided further with the additional function as follows. Incidentally, in the following description, like reference numbers indicate the same elements as illustrated in FIG. 2, and detailed explanation is omitted.

The establishment image association unit 128 is provided further with the functionality of associating an establishment with a different establishment image in accordance with the attribute of this establishment which is determined by the attribute determination unit 126. Specifically describing, for example, when the attribute determination unit 126 determines "barber shop" as the attribute of an establishment, the establishment image association unit 128 associates the establishment with an establishment image B. Alternatively, when the attribute determination unit 126 determines "fashion store" as the attribute of an establishment, the establishment image association unit 128 associates the establishment with an establishment image C. The correspondence relationship between the attribute information of an establishment and the corresponding establishment image generated by the establishment image association unit 128 is stored in the address information storing unit 108.

FIG. 11 is view showing an example of one example of the data structure stored in the address information storing unit of the embodiment 3. In contrast to the address information storing unit 108 shown in FIG. 5, there are different establishment images in the establishment image name field 224 of the address information storing unit 108 shown in FIG. 11 in correspondence with the attributes of the respective establishments.

Figure 12:
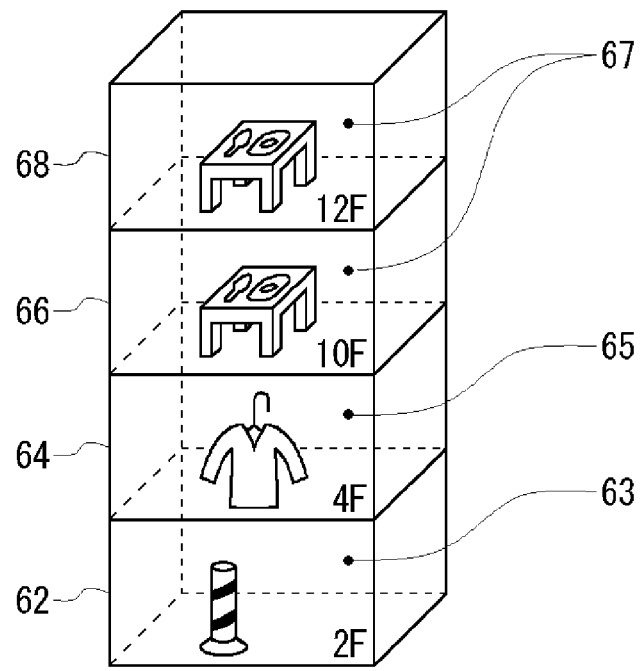
FIG. 12 is a schematic diagram for showing an example of the columnar image to which establishment images are attached in accordance with the embodiment 3.

FIG. 12 is a schematic diagram for showing an example of the columnar image to which establishment images are attached. Specifically describing, FIG. 12 shows the columnar image which is generated by the use of the data structure shown in FIG. 11. Namely, FIG. 12 shows an example of the columnar image which is generated in the case where the storey information extracting section 124 extracts the storey information containing the stories "2nd floor", "4th floor", "10th floor" and "12th floor".

The stereoscopic image generation unit 132 attaches the establishment images of the establishments located in the stories "2nd floor", "4th floor", "10th floor" and "12th floor" which are assigned to the four blocks respectively. Namely, the stereoscopic image generation unit 132 attaches the establishment image 63 of the establishment "ABC" to the first block 62, the establishment image 65 of the establishment "DEF" to the second block 64, the establishment image 67 of the establishment "GHI" to the third block 66, and the establishment image 67 of the establishment "JKL" to the fourth block 68. In this example, the establishment image 63 is the establishment image B representing the attribute of "barber shop", the establishment image 65 is the establishment image C representing the attribute of "fashion store", and the establishment image 67 is the establishment image D representing the attribute of "restaurant".

In accordance with the embodiment 3, it is possible to enable the user to see at a glance the differences among the attributes of the respective establishments by displaying different establishment images for different establishments on the map image.

Embodiment 4

In accordance with the embodiments 1 through 3, a single establishment image is attached to one block corresponding to a certain storey. However, in accordance with the three-dimensional map image generation apparatus 100 of the embodiment 4, a plurality of establishment images are attached to one block corresponding to a certain storey. For example, one block may be partitioned into a plurality of floor spaces (sub-blocks) corresponding to a plurality of different establishments such as "barber shop" and "fashion store", and the establishment images of these establishments are attached to the respective floor spaces.

Figure 13:
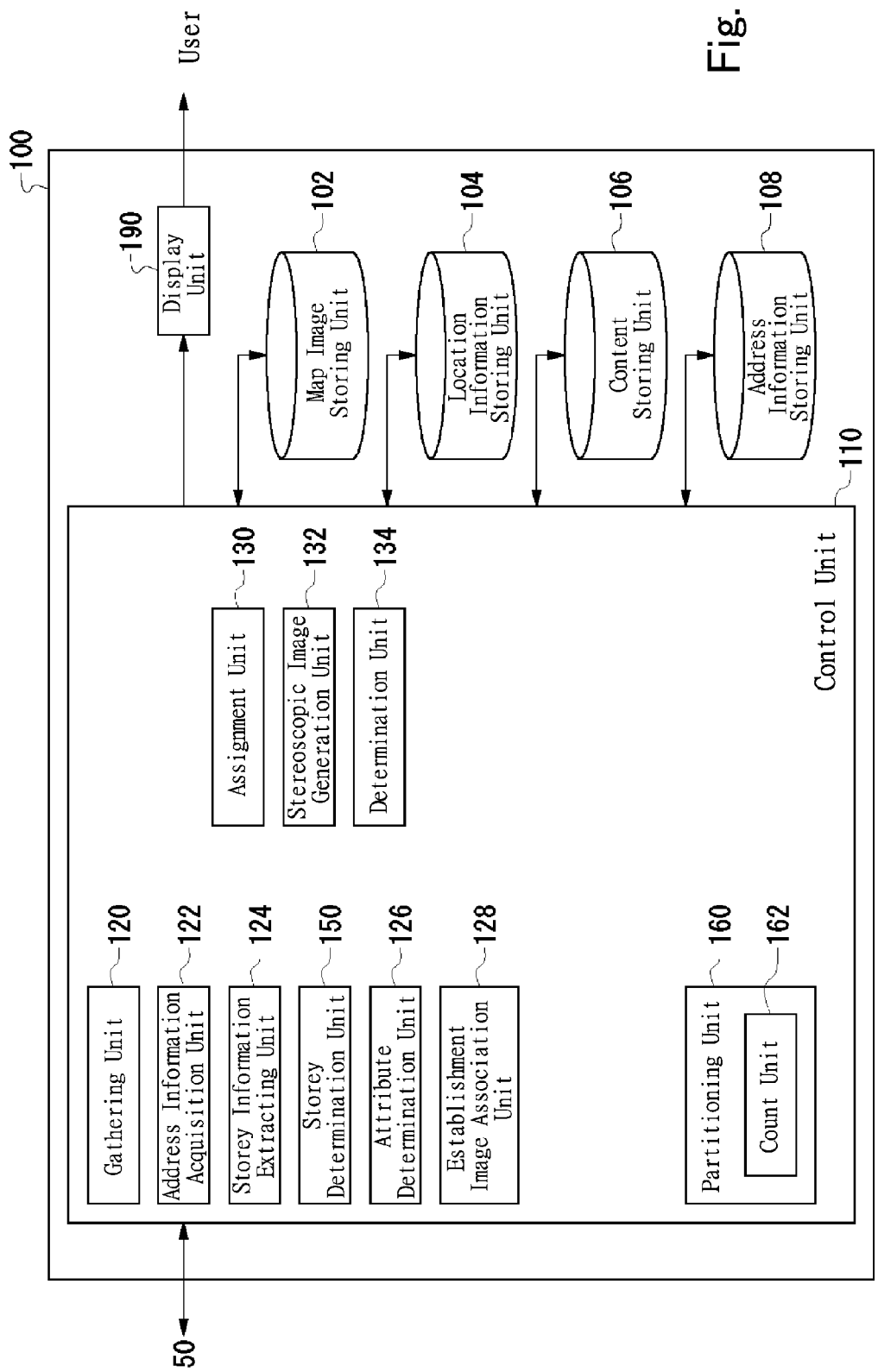
FIG. 13 is a schematic diagram for showing the configuration of a three-dimensional map image generation apparatus in accordance with an embodiment 4.

FIG. 13 is a schematic diagram for showing the configuration of the three-dimensional map image generation apparatus 100 in accordance with the embodiment 4. In FIG. 13, like reference numbers indicate the same elements as illustrated in FIG. 2, and detailed explanation is omitted. As compared with the three-dimensional map image generation apparatus 100 shown in FIG. 2, the three-dimensional map image generation apparatus 100 in accordance with the embodiment 4 is provided further with a determination unit 134.

The determination unit 134 serves to determine whether or not there is a plurality of establishments in the same storey by referring to a plurality of storey information items of the same building which are extracted by the storey information extracting section 124. Specifically speaking, first, the determination unit 134 determines whether or not there are a plurality of storey information items which indicate the same storey of the same building. If there are a plurality of storey information items which indicate the same storey of the same building, it is determined that a plurality of establishments are located in this storey. The determination unit 134 then acquires, from the address information storing unit 108, the names of the establishments associated with the address information which includes the storey information and indicates the same storey, and identifies these establishments.

For example, if the storey information extracting section 124 extracts, as the storey information, "2nd floor", "2nd floor", "10th floor" and "12th floor", the determination unit 134 determines that a plurality of establishments are located in the storey "2nd floor".

The partitioning unit 160 is provided further with the functionality of partitioning, into small rooms (floor spaces), the block associated with the storey which is determined by the determination unit 134 as including a plurality of establishments. More specifically speaking, the partitioning unit 160 counts the number of establishments located in this storey. For example, when there are two establishments in the storey "2nd floor", the partitioning unit 160 partitions the block corresponding to "2nd floor" into two floor spaces.

The stereoscopic image generation unit 132 attaches the establishment images of the plurality of establishments located in the storey determined by the determination unit 134 to the floor spaces generated by the partitioning unit 160 respectively. For example, if an establishment "ABC" and an establishment "DEF" are located in "2nd floor", the stereoscopic image generation unit 132 attaches the establishment image of the establishment "ABC" to one floor space of the block corresponding to "2nd floor" and the establishment image of the establishment "DEF" to the other floor space of the block. In what follows, several examples of methods of partitioning a block and attaching establishment images to the partitioned floor spaces will be explained.

(A) Partition into Equal Floor Spaces

In this case, a block is partitioned into floor spaces of substantially equal areas to which the establishment images of the respective establishments are attached.

Namely, when the determination unit 134 determines that there is a plurality of storey information items which indicate the same storey of the same building, the partitioning unit 160 equally divides the block into floor spaces. For example, the partitioning unit 160 calculates the number of establishments located in the same storey, and equally divides the corresponding block into two or three floor spaces. The stereoscopic image generation unit 132 attaches the establishment images of the plurality of establishments located in the storey determined by the determination unit 134 to the floor spaces generated by equally dividing the corresponding block.

(B) Arrangement Representing Positional Relationship Among Establishments

In this case, by referring to the information indicative of the positional relationship among the respective establishments located in the same storey, the floor spaces corresponding to the establishments are generated in order to realize the spatial relationship among the respective establishments in the block. The establishment image of each establishment is attached to the floor space generated corresponding to this each establishment.

For this purpose, the partitioning unit 160 may be provided with an arrangement determination unit (not shown in the figure) which determines the arrangement (positional relationship) of the establishments within the block corresponding to the storey by referring to the establishment information available for determining the positional relationship of the respective establishments.

Furthermore, the partitioning unit 160 may be provided with a space allocation unit (not shown in the figure) which allocates the floor spaces generated by itself to the establishments together with the establishment images to be applied to the floor spaces respectively. The partitioning unit 160 generates floor spaces in the same number as there are the establishments in the same storey, and arranges the floor spaces in the locations of the block corresponding to this storey in accordance with the arrangement determined by the arrangement determination unit. The stereoscopic image generation unit 132 attaches the establishment images respectively to the floor spaces generated by the partitioning unit 160.

The information available for determining the positional relationship among the respective establishments is, for example, the orientation information relating to the direction in which an establishment faces, the layout information relating to the layout of the floor in which the respective establishments are arranged, and so forth. Specifically describing, if the web site containing information about the establishment "ABC" includes orientation information such as "the east side of 2nd floor of ** building", the partitioning unit 160 generates a floor space in the east side of the block corresponding to the 2nd floor (the right hand side in the screen if the upper direction is north). The stereoscopic image generation unit 132 attaches the establishment image of the establishment "ABC" to the floor space generated by the partitioning unit 160.

(C) Allocation Representing Size Relationship Among Establishments

In this case, by referring to the information indicative of the size relationship among the respective establishments located in the same storey, the floor spaces corresponding to the establishments are generated in order to realize the size relationship among the respective establishments in the block. The establishment image of each establishment is attached to the floor space generated corresponding to this each establishment.

For this purpose, the partitioning unit 160 may be provided with a size determination unit (not shown in the figure) which determines the relative sizes of the establishments within the block corresponding to the storey by referring to the establishment information available for determining the size relationship of the respective establishments.

Furthermore, the partitioning unit 160 may be provided with a space allocation unit (not shown in the figure) which allocates the floor spaces generated by itself to the establishments together with the establishment images to be applied to the floor spaces respectively. The partitioning unit 160 generates floor spaces in the same number as there are the establishments in the same storey, and arranges the floor spaces having the sizes determined by the size determination unit. The stereoscopic image generation unit 132 attaches the establishment images respectively to the floor spaces generated by the partitioning unit 160.

The information available for determining the size relationship among the respective establishments is, for example, the sale information relating to the sales figures at the establishments, the popularity information relating to the popularity ratings of the establishments, the confidence information relating to the degrees of confidence of the establishments, and so forth. For example, the greater the access counter of the web site containing the information relating to an establishment, the higher the popularity rating of this establishment. Also, the older the date of foundation described in the web site containing the information relating to an establishment, the higher the popularity of the establishment.

The space allocation unit of the partitioning unit 160 may allocate the floor space of the largest size to the establishment "ABC" of which the popularity rating is highest among the respective establishments of the storey by referring to the popularity information of the establishments. The stereoscopic image generation unit 132 attaches the establishment image of the establishment "ABC" to the floor space of the largest size generated by the partitioning unit 160.

Figure 14:
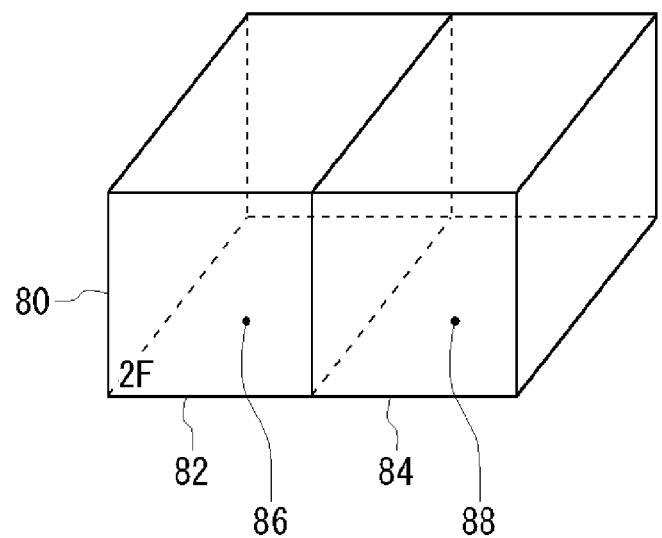
FIG. 14 shows one example of a columnar image to which a plurality of establishment images are attached to the same block corresponding to a certain storey in accordance with an embodiment 4.

FIG. 14 shows one example of a columnar image to which a plurality of establishment images are attached to the same block corresponding to a certain storey in accordance with an embodiment 4. Incidentally, for the sake of clarity in explanation, only one block is illustrated in this figure, for example, one block of a columnar image corresponding to "2nd floor" to which a plurality of establishment images are attached. The block 80 assigned to "2nd floor" is partitioned by the partitioning unit 160 into two floor spaces, i.e., a first floor space 82 and a second floor space 84. The first floor space 82 is allocated to a first establishment, for example, an establishment "ABC", and the second floor space 84 is allocated to a second establishment, for example, an establishment "DEF".

Furthermore, the establishment image 86 of the establishment associated with the establishment name "ABC" is attached to the first floor space 82 by the stereoscopic image generation unit 132, and the establishment image 88 of the establishment associated with the establishment name "DEF" is attached to the second floor space 84 by the stereoscopic image generation unit 132.

In accordance with the embodiment 4, a plurality of establishment images are attached to the same block of the columnar image to represent a plurality of different establishments existing in the same storey, and thereby it is possible to more realistically reproduce the real world by a virtual environment.

Embodiment 5

In accordance with the embodiments as described above, a columnar image is generated in accordance with the height of the highest storey which is determined by the storey determination unit 150. However, in accordance with the embodiment 5, a columnar image is generated to represent a one-floor building in a predetermined condition.

FIG. 15 is a schematic diagram for showing the configuration of the three-dimensional map image generation apparatus 100 in accordance with the embodiment 5. In FIG. 15, like reference numbers indicate the same elements as illustrated in FIG. 2, and detailed explanation is omitted. While the configuration of the three-dimensional map image generation apparatus 100 in accordance with the embodiment 5 has the similar configuration of the three-dimensional map image generation apparatus 100 as illustrated in FIG. 2, a storey information availability determination unit 136 is further provided. Incidentally, the address information stored in the location information storing unit 104 is not necessarily so specific as to uniquely identify the building located in the address information. The address information may be given only so specific as to determine the location where a plurality of buildings, for example five buildings, may be included.

The address information acquisition unit 122 is provided with the functionality of acquiring address information items representing the same address. For example, the address information item "Shop ABC, 1-1, 1-chome, Chuou-cho, Kagoshima-shi, Kagoshima-ken" and the address information item "Shop DEF, 1-1, 1-chome, Chuou-cho, Kagoshima-shi, Kagoshima-ken" are the address information representing the same address of "1-1, 1-chome, Chuou-cho, Kagoshima-shi, Kagoshima-ken".

The storey information availability determination unit 136 serves to determine if there is an address with which no address information item indicative of any storey is associated among the address information items as acquired by the address information acquisition unit 122. For example, the storey information availability determination unit 136 determines that there is no available information item which indicates any storey in the address information item "1-1, 1-chome, Chuou-cho, Kagoshima-shi, Kagoshima-ken", and determines that there is an information item which indicates a storey in the address information item "** Bldg. 3rd floor, 1-1, 1-chome, Chuou-cho, Kagoshima-shi, Kagoshima-ken".

The stereoscopic image generation unit 132 is provided further with the functionality of generating a stereoscopic image having the height corresponding to one storey when the storey information availability determination unit 136 determines that there is no available storey information in association with a particular address. Specifically describing, the stereoscopic image generation unit 132 generates a columnar image having a height of 10 pixels in correspondence with "one aboveground storey". The number of pixels for representing a single storey can be stored in advance in a database (not shown in the figure) provided in the three-dimensional map image generation apparatus 100. Incidentally, the number of pixels in the height direction for representing a single storey may be adjusted within a predetermined range, for example, about 20% in accordance with the building area (footprint) or material (wooden, ferroconcrete or the like) of the building in which the establishment represented by the stereoscopic image is located. The floor size of the establishment may be used in place of the building area for the sake of convenience if the building area is not available. For example, the number of pixels can be increased or decreased in proportion to the total area occupied by the establishment(s). The building area can be calculated by acquiring a detailed map of the area from a map data provider, identifying the outline representing the building, and measuring the area of the outline.

Next, the stereoscopic image generation unit 132 is provided further with the functionality of arranging the generated stereoscopic image in the location on the map image specified by location information associated with address information, which is determined as including no storey information by the storey information availability determination unit 136. For example, if the storey information availability determination unit 136 determines that there is no available information item which indicates any storey in the address information item "1-1, 1-chome, Chuou-cho, Kagoshima-shi, Kagoshima-ken", the stereoscopic image generation unit 132 arranges the generated columnar image in the location which is specified by the location information of the map image in correspondence with the degrees of latitude and longitude associated with the address information, i.e., "latitude 31"36', longitude 130"31'.

If there are a plurality of address information items in the address information which are representing the same address and determined as including no storey information by the storey information availability determination unit 136, the stereoscopic image generation unit 132 performs the following processes.

(A) The stereoscopic image generation unit 132 generates a stereoscopic image having the height corresponding to one storey for each of the address information items determined as including no storey information by the storey information availability determination unit 136, and arranges each generated columnar image in the location which is specified by the corresponding location information item. For example, the stereoscopic image generation unit 132 arranges the stereoscopic image having the height corresponding to one storey in the location of the map image for each address information item in correspondence with the degrees of latitude and longitude associated with the address information, i.e., "latitude 31"36', longitude 130"31'. For example, the stereoscopic image is arranged for each address information item in the rectangular area of a predetermined size centered at the position corresponding to the degrees of latitude and longitude. Alternatively, in the case where the map image stored in the map image storing unit 102 has been partitioned in advance into a plurality of areas, the columnar image can be arranged in an area including the position corresponding to the degrees of latitude and longitude. Furthermore, as another example, even in the case where the map image stored in the map image storing unit 102 is not partitioned into a plurality of areas, if the location specified by the degrees of latitude and longitude corresponds to a certain area on the map image, the columnar image can be arranged in each of small partitions into which this certain area is equally partitioned.

(B) The stereoscopic image generation unit 132 generates one stereoscopic image having the height corresponding to one storey, and partitions the generated stereoscopic image into a plurality of blocks, for example, in the same number as there are the address information items, which are determined as including no storey information by the storey information availability determination unit 136. For example, the stereoscopic image generation unit 132 generates one stereoscopic image having the height corresponding to one storey, and arranges the generated stereoscopic image in the location of the map image in correspondence with the degrees of latitude and longitude, i.e., "latitude 31"36', longitude 130"31'. Next, the stereoscopic image generation unit 132 partitions the stereoscopic image, which is arranged, into a plurality of blocks to each of which the establishment image of the establishment corresponding thereto is attached.

In accordance with the embodiment 5, the stereoscopic image generation unit 132 automatically generates a stereoscopic image having the height corresponding to one storey when the storey information availability determination unit 136 determines that there is no available storey information, and therefore it is possible to alleviate the burden on the personnel in charge of generating three-dimensional map images. Also, since a stereoscopic image having the height corresponding to one storey is automatically generated when the storey information availability determination unit 136 determines that there is no available storey information, it is possible to represent, in a virtual environment, low-rise constructions which exist in large numbers in the real world. In Europe and the United States, as compared with Japan, there are more low-rise constructions than high-rise constructions, and thereby the technical concept of this embodiment is effective particularly in Europe and the United States. Alternatively, it is possible to make use of a stereoscopic image having the height corresponding to two stories (or 1.5 stories and so forth) instead of one storey depending upon the geographical area, such as Japan.

So far, the present invention has been explained through several preferred embodiments. In what follows, several exemplary modifications will be explained.

The address information acquisition unit 122 in accordance with the above embodiments uses the address information stored in the location information storing unit 104 as a keyword phrase. However, in a modification example, it is possible to set the name of the building as a keyword phrase to acquire the address information items representing the same building. For example, if " Bldg" is set as a keyword phrase, the address information acquisition unit 122 acquires additional items of address information such as " Bldg. 2nd floor, 1-1, 1-chome, Chuou-cho, Kagoshima-shi, Kagoshima-ken", " Bldg. 4-th floor, 1-1, 1-chome, Chuou-cho, Kagoshima-shi, Kagoshima-ken", and the like. Incidentally, the keyword phrase such as " Bldg" may be acquired as a result of searching the content storing unit 106 or a telephone directory database provided by an external server for a keyword "Bldg" or "Building".

In accordance with the above described embodiments, a columnar image is generated with an establishment image attached thereto on the basis of the content contained in the web site. However, in a modification example, a columnar image can be generated with an establishment image attached thereto on the basis of the address content indicative of the address information of the establishment in the real world stored in an external telephone directory database. In this case, the gathering unit 120 gathers the address content contained in the external telephone directory database through the communication network 12 to save the address content in the content storing unit 106 on a regular or irregular base. Next, the address information acquisition unit 122 acquires the address information items which are associated with the same building from the content storing unit 106. The subsequent steps are performed in the same manner as in the above embodiments. In accordance with this modification example, the three-dimensional map image can be automatically and easily generated together with columnar images representing buildings in the real world on the basis of the address content stored in the external telephone directory database.

The storey determination unit 150 of the above embodiments determines the highest storey of a building on the basis of the stories contained in the storey information, which are extracted by the storey information extracting section 124. However, in a modification example, the storey determination unit 150 can be designed to determine whether or not each storey contained in the storey information is credible, and determines the highest storey (threshold) of the building on the basis of the stories contained in the storey information, which are determined as being credible. For example, "100th storey" can be set in advance as the maximum height (the maximum number of stories) of the highest storey in the three-dimensional map image generation apparatus 100 such that, if the height of the storey indicated by the storey information exceeds this maximum height, the storey determination unit 150 determines that the storey indicated by the storey information is not credible.

Meanwhile, the maximum height may be set to a different value for a different region (prefecture, city or the like). Also, the maximum height may be determined by taking into consideration the heights of other buildings in the vicinity. For example, if there is no building having three or more stories in the vicinity, the height of 50th storey is considered not credible and it is determined that the storey information indicative of such a high-rise building is excluded from consideration. Alternatively, the maximum height may be set to a different value for a different building area or material of the establishment. In this case, the storey determination unit 150 determines the maximum height by referring to the building area or material of the establishment in association with the address information containing the storey information which is extracted by the storey information extracting section 124. For example, if the building area of the building including an establishment is 100 square meters, the maximum height of the highest storey of the building is set to "100th storey". Also, if the material is wooden, the maximum height is set to "4th storey".

In accordance with this modification example, the quality of the three-dimensional map image can be improved by excluding incredible stories indicated by the storey information from the stories on the basis of which the highest storey can be determined.

In accordance with the embodiments as described above, the height of the block for use in partitioning the columnar image does not change. However, in a modification example, the height of the block may be adjusted in accordance with the attribute of the establishment. In this case, the three-dimensional map image generation apparatus 100 is provided further with an adjustment unit (not shown in the figure) which adjusts the height of the block for partitioning a columnar image in accordance with the attribute of the establishment represented by the columnar image.

Specifically describing, the adjustment unit refers to the establishment information corresponding to the address information acquired by the address information acquisition unit 122, and determines the attribute of the establishment associated with the address information, for example, the floor size or material of the establishment. The adjustment unit adjusts the height of the block which is assigned to the storey of the establishment on the basis of the attribute of the establishment associated with the address information, for example, the floor size or material of the establishment. For example, if the floor size of the establishment is greater than a predetermined threshold value (e.g., in the case of a gymnasium), the adjustment unit set the height of the block corresponding to the storey, in which the establishment is located, to a greater value than the default height of the block. If the default height is represented by, for example, five pixels, the height of the block corresponding to the storey, in which the establishment is located, is increased to six pixels.

Alternatively, if the material of the establishment is wooden, the height of the block corresponding to the storey is set to a smaller value than the default height of the block. If the default height is represented by, for example, five pixels, the height of the block corresponding to the storey, in which the establishment is located, is increased to four pixels.

In accordance with this modification example, it is possible to create a virtual environment and realistically reproduce the real world by adjusting the height of the block in accordance with the attribute of the establishment such as the floor size or material.

In accordance with the embodiments as described above, the three-dimensional map image generation apparatus 100 is provided with the map image storing unit 102. However, in a modification example, it is possible to provide this map image storing unit 102 in an external server rather than in the three-dimensional map image generation apparatus 100. In this case, the three-dimensional map image generation apparatus 100 acquires the map image stored in the map image storing unit 102 of the external server through the communication network 12 shown in FIG. 1. By this configuration, the entire configuration of the three-dimensional map image generation apparatus 100 can be designed in a more compact fashion.

In accordance with the above described embodiments, the columnar images representing buildings are arranged in the map image. However, in a modification example, it is possible to further arrange, in the map image, an image or symbol representing a device equipped with a GPS (Global Positioning System) such as a satellite positioning system or a person who is walking with this system. More specifically speaking, the three-dimensional map image generation system 10 acquires the location information of the device equipped with the GPS through the communication network 12 shown in FIG. 1, and arranges a small image or symbol representing this device in the position indicated by the GPS location information in the map image. Incidentally, the three-dimensional map image generation apparatus 100 determines whether the device is carried on a vehicle or whether a walking person is carrying the device in accordance with the motion speed of the device. In accordance with this modification example, it is possible to express an actually moving vehicle equipped with GPS system or an actually walking person with a GPS locator-equipped cell-phone, and create a virtual environment and realistically reproduce the real world.

Also, in the case where an actually existing person can be expressed in the virtual environment, it is possible to exchange messages or perform voice conversation with a person living far away, the manager or staff of a shop or the like person through the communication channel provided by the three-dimensional map image generation apparatus 100.

In accordance with the above described embodiments, the columnar image to which the establishment image is attached is generated. However, in a modification example, the three-dimensional map image generation apparatus 100 acquires the location information indicative of the positions of commodities in the establishment, specifies the position of each commodity in the block of the columnar image indicated by this location information, and superimposes an image representing this each commodity in the specified position to the establishment image. The location information indicative of the positions of commodities in the establishment is given, for example, as orientation information such that the commodity is placed on a shelf in the east side of the establishment or hung up on the north wall.

Specifically describing, in the case where each commodity is provided with an IC tag for commodity management through wireless communication, the IC tag can be used for controlling the location information indicative of the position of each commodity in the establishment through wireless communication. The location information is received by a server installed in the establishment. Next, this server transmits the received location information of the commodity to the three-dimensional map image generation apparatus 100 through the communication network 12 shown in FIG. 1.

The stereoscopic image generation unit 132 in the three-dimensional map image generation apparatus 100 receives the location information as transmitted from the server installed in the establishment, and determines the position of the commodity in the block on the basis of this location information. For example, if the location information of the commodity indicates "the east side of the establishment", the stereoscopic image generation unit 132 determines that the commodity is located in the east side of the block (the right hand side in the screen if the upper direction is north). Furthermore, the stereoscopic image generation unit 132 attaches an image representing the commodity in this position to the establishment image. In accordance with this modification example, it is possible to create a virtual environment and realistically reproduce the real world by visually expressing, in the three-dimensional map image, the positional relationship of the commodities provided by the establishment in the real world.

In accordance with the above described embodiments, the stereoscopic image generation unit 132 attaches an establishment image to an establishment irrespective of whether or not the establishment actually exists in the real world in the address indicated by the address information which is acquired by the address information acquisition unit 122. However, in a modification example, the address information acquisition unit 122 does not attach an establishment image to an establishment if it is determined that the establishment does actually not exist in the real world in the address indicated by the address information which is acquired by the address information acquisition unit 122.

For example, while a large number of shop information items can be collected from online shopping malls, there are many shops in online shopping malls which are operating solely via the Internet. These shops are excluded from the effective establishment information of the present invention. It is thereby possible to realize the virtual space in the map image which can be used also as an online shopping mall in which shops are arranged in the same manner as in the real world in which offline shopping mall are arranged in correspondence with the online shopping mall. In other words, this virtual space can be a mirrored earth (Mirrearth) which is partially mirroring the actual earth in terms of real life. Such an interface is effective and friendly particularly for people without technology related skills technological skills such as elderly persons to alleviate the so-called digital divide problem.

In this case, the three-dimensional map image generation apparatus 100 is provided further with a premises existence determination unit which determines whether or not a premises corresponding to the establishment is actually located in the real world in the address indicated by the address information which is acquired by the address information acquisition unit 122. More specifically speaking, this premises existence determination unit determines whether or not a premises corresponding to the establishment is actually located in the real world in the address indicated by referring to the establishment information corresponding to the address information acquired by the address information acquisition unit 122. For example, the premises existence determination unit makes the determination on the basis of whether or not the establishment information contains premises information indicating that the establishment actually exists as a brick-and-mortar shop in the real world. This premises information includes, for example, information about an access guide, parking availability or map with which customers can go to the premises, a message such as "We appreciate your visit to our shop", business hour information such as the opening and closing times, promotional information effective to attract more customers, for example, information about a coupon ticket, an event or the like. Optionally, in the case where an office of the establishment is located in the address indicated by the address information but the office does not have a customer-oriented store front, the premises existence determination unit may determine that a premises does actually not exist. Conversely, even in such a case, it is also possible to determine that a premises actually exists when there are very few establishments in the vicinity of the location.

When the premises existence determination unit determines that no premises is actually located in the real world corresponding to an establishment located in the address indicated by the address information which is acquired by the address information acquisition unit 122, the stereoscopic image generation unit 132 does not attach the establishment image of the establishment. Generally speaking, the reliability of a brick-and-mortar shop in the real world is considered to be high as compared with an internet-based shop that lacks customer-oriented store fronts in the real world. In accordance with this modification example, it is possible to provide a three-dimensional map image which is improved in terms of reliability with columnar images in which only brick-and-mortar shops are arranged in the map image by excluding the establishment therefrom if no premises is actually located as a brick-and-mortar shop corresponding to this establishment in the real world.

Also, other appropriate criteria may be used for improving the reliability. For example, in the case where an address information item indicates that a shop is located in a building, it is considered likely that this shop is actually located in the building, if the building includes a number of other shops. Conversely, if the building includes no other shop, it is considered unlikely that this shop is actually located. Accordingly, the reliability can be improved by taking into consideration the number of other shops located in the building.

Furthermore, it is possible to make use of the reliability degrees of web pages which can be calculated by the technique as described in the applicant's United States Patent Published Application No. 20070208699. Namely, if the reliability degree of a web page is no higher than a predetermined level, the information of this web page is excluded to improve the reliability of the three-dimensional map image.

In accordance with the above described embodiments, the display unit 190 displays a three-dimensional map image representing the real world in the present time to the users. However, in a modification example, the display unit 190 displays a three-dimensional map image representing the real world in a past time which is designated by a user. In this case, the three-dimensional map image generation apparatus 100 is provided further with a construction year determination unit to be described below.

The map image storing unit 102 of this modification example stores different map images for past periods respectively. For example, the map image storing unit 102 stores a map image for each year from 1500 to the current year. The construction year determination unit can determine the construction year in which the building including an establishment was built by referring to the establishment information of the establishment located in the address indicated by the address information which is acquired by the address information acquisition unit 122.

For example, the construction year determination unit determines the year in which the establishment was established by referring to the foundation year of the establishment contained in the establishment information. Next, if only one address information item is contained in the address information which is acquired by the address information acquisition unit 122, i.e., if only one establishment is found in association with the same building, the construction year determination unit determines that the foundation year of the establishment is the same as the construction year in which the building including the establishment was built. On the other hand, if a plurality of address information items are contained in the address information which is acquired by the address information acquisition unit 122, i.e., if a plurality of establishments are located in the same building, the construction year determination unit determines that the construction year in which the building including the establishment was built is equal to the earliest year of the foundation years of the establishments. Of course, if the construction year in which the building including the establishment was built is directly described in the establishment information, the construction year determination unit can determine that the building was built in this construction year.

The stereoscopic image generation unit 132 is provided further with the functionality of acquiring the map image associated with the year which is determined by the construction year determination unit from the map image storing unit 102 and arranging the columnar image which represents the building in the map image. For example, if the construction year is 1970, the columnar image which represents the building is arranged in the map images of 1970 and thereafter. The map image with the arranged columnar image is stored in the database of the three-dimensional map image generation apparatus 100. When receiving a request for reference to the map image of the period designated by the user, the display unit 190 acquires the map image with the arranged columnar image from the database and displays the map image to the user.

Alternatively, it is possible to generate a map image with arranged columnar images representing, not only the real world of the current time or a past time but also the real world of a future time. In this case, the construction year determination unit determines the scheduled date of completing the construction of an establishment in the address indicated by the address information which is acquired by the address information acquisition unit 122 by referring to the establishment information. For example, if the establishment information includes a phrase "scheduled establishment date is 2050", the construction year determination unit determines that the scheduled establishment date is 2050. The stereoscopic image generation unit 132 acquires the map image associated with the year which is determined by the construction year determination unit from the map image storing unit 102 and arranges the columnar image which represents the building in the map image as acquired. For example, if the establishment information includes the information that the scheduled date of completing the construction of the building is 2050, the stereoscopic image generation unit 132 arranges the columnar image which represents the building in the map image of 2050.

Alternatively, it is possible to further arrange the images of well-known persons who are in the past and present in the map image of each year with the arranged columnar images. More specifically speaking, first, the stereoscopic image generation unit 132 specifies the lifetimes and birthplaces of well-known persons by acquiring the life information of these persons from web sites. For example, if there is the information in a web site that "Saigo Takamori, born on Feb. 7, 1827, died on 24 Sep. 1877, 23-1, Kajiya-cho, Kagoshima-shi, Kagoshima-ken", the stereoscopic image generation unit 132 attaches an image of Saigo Takamori to the map image of each year from 1827 to 1877 in the location in the map image which is specified by the address information item "23-1, Kajiya-cho, Kagoshima-shi, Kagoshima-ken".

In accordance with this modification example, it is possible to give the user a feeling of being in the real world of the past or future through time-slip by displaying to the user the three-dimensional map image representing the real world of not only the present time but also the past or future time.

In accordance with the above described embodiments, if there are a plurality of establishments in the same storey of the same building, the block associated with the storey is partitioned into a plurality of small rooms (floor spaces). However, in a modification example, when one of the plurality of establishments can no longer be found, the floor space assigned to this establishment is merged into a neighbouring floor space. As compared with the three-dimensional map image generation apparatus 100 shown in FIG. 2, the three-dimensional map image generation apparatus 100 in accordance with this modification example is provided further with a merging unit.

The merging unit serves to merge an appropriate one of the plurality of floor spaces partitioned by the partitioning unit 160 into another floor space thereof. More specifically speaking, first, the merging unit determines whether or not the establishment assigned to each of the floor spaces generated by the partitioning unit 160 is actually present by referring to the content stored in the content storing unit 106. Next, the merging unit merges the floor space assigned to an establishment which is associated with a block but determined as not being present into another floor space assigned to another establishment which is associated with the same block and determined as being actually present. In accordance with this modification example, it is possible to update the partitioning of the block.

In accordance with the above described embodiments, the stereoscopic image generation has been described by mainly utilizing text data contained in Web pages. However, in a modification example, it is possible to make use of other types of content such as image data, motion picture data, sound data and the like electronic data for the same purpose. For example, in the case where the address information is given only as a map image, the three-dimensional map image generation apparatus 100 may analyze this map image, for example, by a pattern recognition program such as an OCR program to obtain text data in character code. Alternatively, in the case where the address information is a map image or a motion picture including an image of a building, it is also possible to directly generate a columnar image by the use of an image processing program which extracts a profile of the building.

Figure 16:
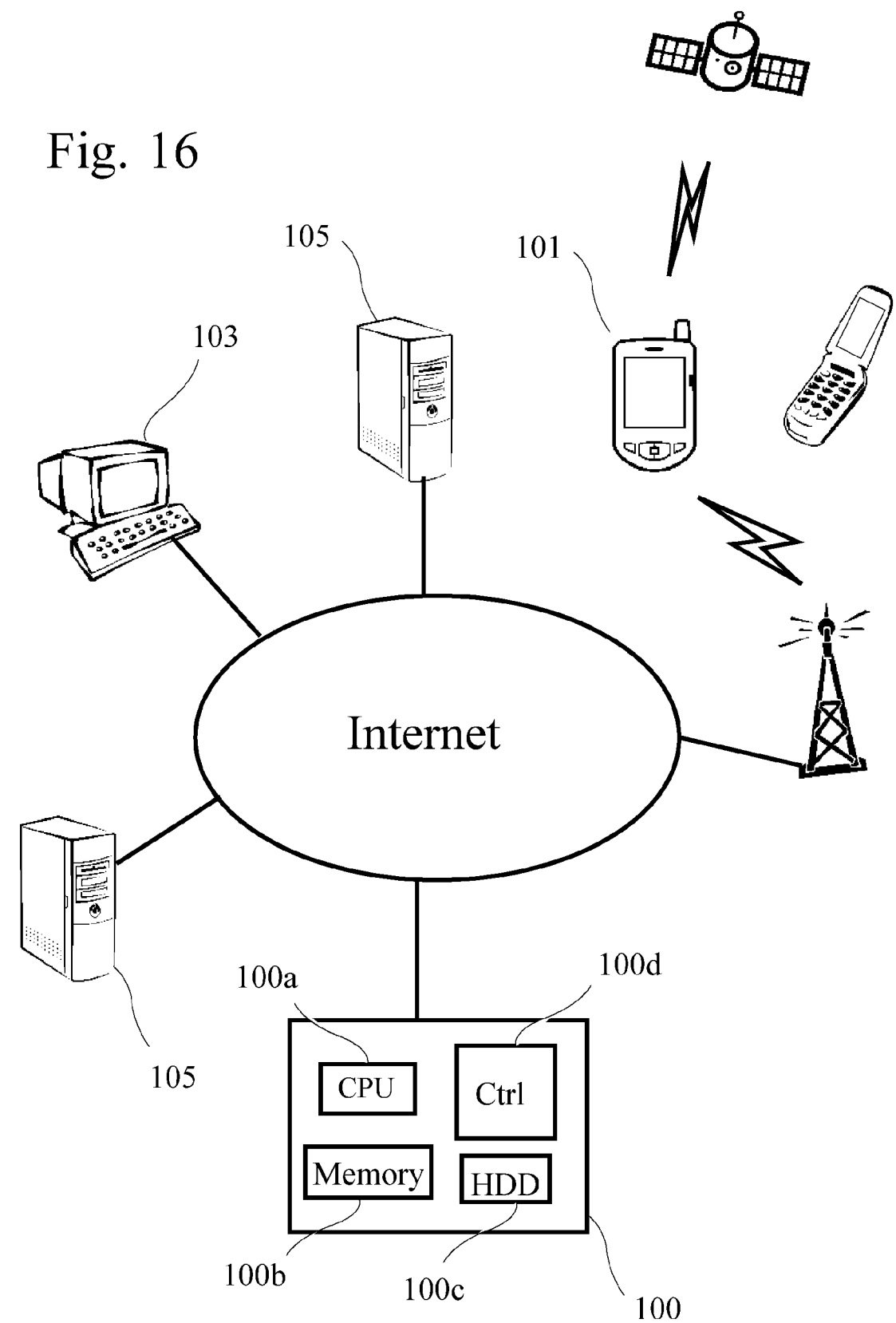
FIG. 16 is a schematic diagram for showing an exemplary implementation of the three-dimensional map image generation apparatus in accordance with the present invention as a web server connected to the Internet.

Next, a typical usage situation for the three-dimensional map image generation apparatus 100 will be explained for the purpose of describing an exemplary implementation of this apparatus as a web server 100 as shown in FIG. 16. The web server 100 is connected to the Internet, and implemented with a general purpose computer such as a workstation, a personal computer or the like, which usually includes a CPU 100*a*, a memory 100*b*, a HDD 100*c* and other controlling circuitry 100*d* including buses (not shown in the figure). In this example, the user uses a smartphone or any other mobile communication equipment 101 which is equipped with a GPS receiver and a built-in camera and can be connected to the Internet for communicating with the web server 100 through a base station or the like. In FIG. 16, numeral 105 indicates web servers which may be sources of establishment information, and numeral 103 indicates a desktop personal computer which can be used in the same manner as the mobile communication equipment 101 in accordance with the present invention.

Namely, first, the web server 100 may receive a request message for map image from the mobile communication equipment 101 held by the user together with GPS location information. In response to this request message, the web server 100 generates a two-dimensional map image corresponding to the area around the location indicated by the GPS location information, for example, the map image M1 as illustrated in FIG. 17, and transmits the image data thereof to the mobile communication equipment 101. In the two-dimensional map image M1, the user is indicated by a human icon as illustrated. The mobile communication equipment 101 receives the image data and displays the two-dimensional map image M1 on the screen thereof. In this two-dimensional map image M1, there are the outlines of buildings (only one example is illustrated for the sake of clarity) located in the area in which icons or symbols of establishments are superimposed to indicate the business kinds of the establishments, i.e., a restaurant, a coffee shop, a clinic and a vacant tenant space in this example. The user can know what types of services can be received at the establishments from this two-dimensional map image M1. If the mobile communication equipment 101 is equipped with an electronic compass chip, it can transmit GPS location information together with orientation information. In response to a request message for map image containing such orientation information, the web server 100 generates a two-dimensional map image as viewed in this orientation, and returns the two-dimensional map image to the mobile communication equipment 101.

In this case, the two-dimensional map image as viewed in this orientation is, for example, the two-dimensional map image displayed such that South is at the top of this map if the orientation information indicates South, i.e., the user faces in the southward direction. Alternatively, in the case where a human icon is displayed in the two-dimensional map image as illustrated in the map image M1, the direction the human icon faces is adjusted in agreement with the orientation indicated by the orientation information, i.e., the left direction in the map image M1. In other words, the human icon is displayed to be walking in the map image in the same manner as the user is walking in the real world. Furthermore, in this case, the orientation of the map image can be adjusted in order that the human icon is always walking in the upward direction, i.e., toward the top of this map. In this specification, the phrase "map image as viewed in the orientation" is intended to broadly mean "map image which is displayed in order that the orientation in the map image can be recognized with reference this map image".

The building image operatively includes a hyperlink in the two-dimensional map image M1. The building image itself serves as the hyperlink in this example. The user can therefore open and view a three-dimensional map M2 of the building, if desired, by clicking this hyperlink with a finger, stylus pen or mouse on the screen of the mobile communication equipment 101, or another appropriate operation with a keyboard or the like as illustrated in FIG. 17. Furthermore, the user may wish to view the details of one floor, i.e., 4-th floor in this case.

For example, if a floor is divided into sub-blocks (rooms) in the map image, each sub-block may operatively include a hyperlink to a detailed map. Also, if a floor includes icons, symbols or the like representing establishments, these icons, symbols or the like may operatively include a hyperlink to a detailed map. In the three-dimensional map M2 of this example, each icon and character string corresponding to an establishment serves as a hyperlink to a detailed map. This floor can be viewed in details by clicking this hyperlink displayed on the screen of the mobile communication equipment 101. Namely, as illustrated in FIG. 17, an expanded three-dimensional map image M3 is displayed with several content items which have been collected by the process as described above in correspondence with the establishments assigned to the floor spaces in the 4-th floor.

Still further, each floor space may include a hyperlink in the expanded three-dimensional map image M3 to access the web site of the establishment corresponding to this floor space. For example, the illustrated coffee shop area serves as the hyperlink. The user can open the web site of the coffee shop, if available, for finding more information by clicking the floor space allocated to the coffee shop. Alternatively, the hyperlink may be set up only to the character string of the shop name of the coffee shop rather than the entire floor space. In this case, the color of the character string may be changed to a hyperlink color to avoid wrong operation.

The above stepwise operations from the two-dimensional map image M1 to the expanded three-dimensional map image M3 through the three-dimensional map M2 is particularly effective in the case of mobile communication equipment 101*s* which usually have only small screens.

Optionally, the web server 100 is provided with a member registration and login system. For example, the owner of the coffee shop can register as a member of the system, and edit the design of his virtual shop in the three-dimensional image M3. After logged in the system, the owner can upload new images or content to replace the old ones. The owner can therefore update and improve the design of his virtual shop to aim to attract new customers.

Figure 18:
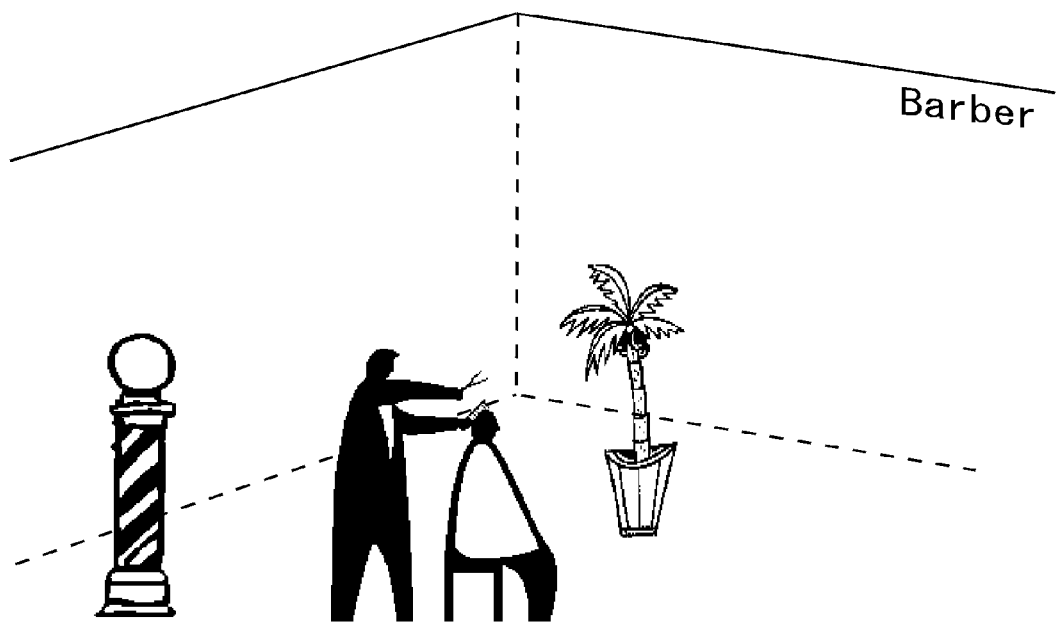
FIG. 18 is a schematic diagram for showing an example of a template for representing a barber in accordance with the present invention.

In this case, for example, the web server 100 first creates the floor space by selecting one of floor design templates corresponding to the business kind, and applying the selected floor design template to this floor space. The floor design templates are provided in advance on the web server 100 side respectively for the kinds of establishments in order to visually represent the typical layouts of the establishments such as catering establishment, hairdressing establishment (as illustrated in FIG. 18) and so forth. The templates may be provided in X3D which is the ISO standard XML-based file format for representing 3D computer graphics. The web server 100 may next add content collected from the web site of the establishment as described above, to the template. The registered user can edit the template of his shop to make it more attractive and update the information. For example, the owner of the coffee shop may add a coupon icon as illustrated in FIG. 17.

The user of the map image can open the coupon window of the home page of the coffee shop by clicking this coupon icon, and get a discount coupon or the like therefrom.

In contrast with known Internet-based virtual worlds consisting of virtual objects which are designed and developed entirely separated and independent from the real world, the virtual space in accordance with the present invention can provide a concise view of the real world itself together with the information of the establishments located in the designated area (for example, about the present location). The virtual space therefore not only brings fun to mobile computing but also has practical benefits.

In accordance with the present invention, any types of information available through the Internet are indexed in the database as long as the information is associated with geographical address information, and visualized in a three-dimensional map in order that the user can make effective use of the information in connection with the geographical environment.

Referring to FIG. 17 again, the image representing the building in the map image M2 includes an indication "For Lease". This indication means that "you may become a tenant of this space". This indication operatively includes a hyperlink to the URL of the source of this information. The user can confirm the authenticity and validity of this information by clicking this indication or the floor space assigned thereto and opening the URL. A large number of real estate information items can be gathered from web pages in the same manner as explained above by the use of relevant search terms such as "real estate", "price", "location", "tenants" and so forth. The validity of the information is maintained by periodically updating the database as described above.

Also, along with the advent of the Internet technology, there have been a variety of information providing services. The present invention can be embodied in a more effective manner by the use of some of such services. For example, the stereoscopic image generation unit 132 can use a web map service capable of providing 360° panoramic street-level views and allowing users to view parts of selected cities and their surrounding metropolitan areas at ground level, for generating stereoscopic images representing office buildings, dome buildings, spherical constructions and so forth. Namely, three-dimensional information of buildings can be extracted from the 360° panoramic street-level views by image-processing techniques and used for determining the three-dimensional profiles of the buildings in the map image.

The 360° panoramic street-level views can be used also for determining which direction the user is facing. Namely, even without an electronic compass, the user can view a map image corresponding to the view he is seeing in the screen of the mobile communication equipment 101. More specifically explaining, the user sends a request message for map image, together with the GPS location information and an image of the view he is seeing, for example, taken at an intersection of a street by the camera provided in the mobile communication equipment 101, to the web server 100 of the present invention. When receiving the request message, the web server 100 performs an image analyzing process for comparing the image of the user's view with views in the four directions at the intersection obtained from the 360° panoramic street-level views. The orientation of the user's view can be determined by matching information with the views in the four directions. The web server 100 returns a map image of the intersection viewed in the determined orientation to the mobile communication equipment 101. The user can view the map image corresponding to the view he is seeing in the screen of the mobile communication equipment 101. The map image includes the information inside the building unlike the actual view.

Alternatively, even if the mobile communication equipment 101 is not provided with a camera, it is possible to provide the map image corresponding to the view the user is seeing in the screen of the mobile communication equipment 101. In this case, it is indispensable that the user goes straight for a while with the GPS measurement being operated in advance of sending a request message for map image. The request message for map image is sent together with the orientation information which is obtained from the results of the GPS measurement along the user's path. When receiving the request message, the web server 100 returns an map image as viewed in the orientation to the mobile communication equipment 101. The user can view the map image, corresponding to the view he is seeing in the real world, in the screen of the mobile communication equipment 101.

In accordance with the above described embodiments, the three-dimensional map image generation apparatus 100 generates three-dimensional map images by the use of a database which is provided in advance in the map image storing unit 102, the location information storing unit 104, the content storing unit 106 and the address information storing unit 108. However, it is also possible to dynamically generate a three-dimensional map image in response to a request received from a user terminal through the Internet together with geographical data.

Namely, the web server 100 may be provided with a three-dimensional map image generation program which can generate a three-dimensional map image, without establishing a database, by accessing an external web map server and an external Internet search engine each time a request for map image is received. The three-dimensional map image generation program comprises computer-implemented code and data stored in a computer readable medium, in a computer-readable manner, for causing the web server 100 to carry out the steps of: receiving a request for a map image from a user together with geographical data (address or the degrees of latitude and longitude); retrieving a map image near the location indicated by the geographical data from the web map server available through the Internet; searching for establishment information items in association with addresses which are located in the map image by the use of an Internet search engine with a keyword phrase(s) corresponding to the addresses as has been discussed above; superimposing a visual indication such as an icon, symbol, character string or the like indicative of the establishment corresponding to an establishment information item in a position on the map image corresponding to the address of this establishment; and displaying the map image to the user together with the visual indication superimposed on the map image.

In a typical usage, first, the web server 100 receives a request for map image from the mobile equipment 101 held by the user together with GPS location information. In response to this request, the web server 100 sends a request for map image with the location information to a web map server 105 available through the Internet, and obtains the map image near the location indicated by the GPS location data. Also, the web server 100 searches for content items containing establishment information items in association with addresses, which are located in the map image, by the use of an Internet search engine. On the other hand, a visual indication indicative of the establishment corresponding to each of the establishment information items is generated in a position on the map image corresponding to the address of this establishment, as illustrated in FIG. 17 and in the same manner as has been discussed above, for example, by the use of a symbol, a template and so forth prepared in advance. The web server 100 returns the map image to the mobile equipment 101 together with the visual indication superimposed on the map image. The mobile equipment 101 displays the map image to the user.

Alternatively, this dynamic three-dimensional map image generation process can be implemented without an external web server such as the web server 100. In this case, the three-dimensional map image generation program is installed in the mobile equipment 101 and operated in the following way. First, the user inputs a request for map image through the touch panel or buttons of the mobile equipment 101. The mobile equipment 101 sends a request for map image with GPS location information indicative of the user's position to the web map server 105 available through the Internet, and obtains the map image near the location indicated by the geographical data. Also, the mobile equipment 101 searches for content items containing establishment information items in association with addresses, which are located in the map image, by the use of an Internet search engine. On the other hand, a visual indication indicative of the establishment corresponding to each of the establishment information items is generated in a position on the map image corresponding to the address of this establishment, as illustrated in FIG. 17 and in the same manner as has been discussed above, for example, by the use of a symbol, a template and so forth prepared in advance. The mobile equipment 101 displays the map image to the user together with the visual indication superimposed on the map image.

The dynamic three-dimensional map image generation process can be performed either the web server 100 or the mobile equipment 101 at least in principle. From a technical view point, this is a problem of the processing power of the mobile equipment 101. If the processing power of the mobile equipment 101 is not so high, the dynamic three-dimensional map image generation process has to be performed external to the mobile equipment 101.

In accordance with such a dynamic three-dimensional map image generation process, the generation of a database can be dispensed with, and a map image can be generated from the latest data available. However, it may take much time to complete the process such that the user is sometimes kept waiting for a while until the map image is displayed.

Figure 19:
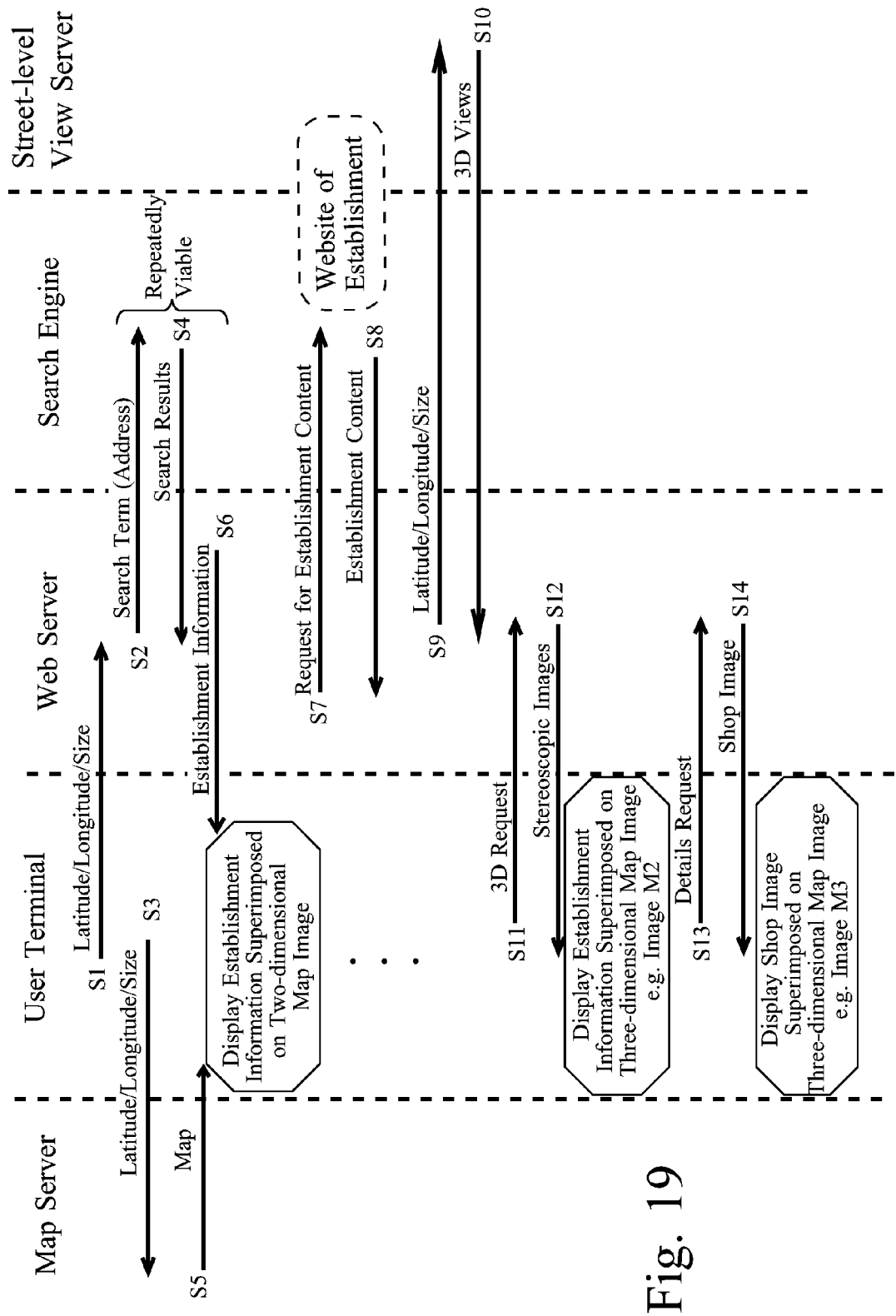
FIG. 19 is an explanatory view for showing the process of exchanging messages and information among a web server serving to provide three-dimensional map images, a user terminal which receives the three-dimensional map image from the web server, a map server serving to provide two-dimensional map images, a search engine serving to carrying out a search on the Internet, a street-level view server serving to provide 360° panoramic street-level views, and web sites of establishments.

Next, an implementation example to reduce this latency will be explained. FIG. 19 is an explanatory view for showing the process of exchanging messages and information among a web server serving to provide three-dimensional map images, a user terminal which receives the three-dimensional map image from the web server, a map server serving to provide two-dimensional map images, a search engine serving to carrying out a search on the Internet, a street-level view server serving to provide 360° panoramic street-level views, and web sites of establishments.

First, in step S1, the user terminal transmits a request message to the web server. This request message contains information about the degrees of latitude and longitude of the present location and a size of the area to request the establishment information in the area. The size is designated by the number of pixels of the area in the X direction and the Y direction and the resolution (contraction scale). When receiving this request message, in step S2, the web server searches a database provided therein for the addresses corresponding to the area, and sends a search request to the search engine with a search term of the address (for example, "1-1, 1-chome, Chuou-cho, Kagoshima-shi, Kagoshima-ken"). The search engine returns a search result to the web server in step S4.

Just after transmitting the request message to the web server in step S1, the user terminal creates another connection and transmits a request message to the map server. This request message contains information about the degrees of latitude and longitude of the present location and a size of the area to request a map image corresponding to the area. In response to this request message, the map server returns a response message together with the map image corresponding to the area in step S5.

After receiving the search result in step S4, the web server analyzes the search result, acquires establishment information, and returns the establishment information to the user terminal as the attachment of a response message in step S6. This establishment information contains, for example, the kinds of business, shop names and the number of stories as has been discussed above. After receiving the map image in step S5 and the establishment information in step S6, the user terminal displays the map image on the display and superimposes the symbols indicative of the kinds of business and the shop names on the map image in correspondence with the address.

The above steps S2, S4 and S6 are repeatedly performed with changing the address as a search term. Namely, the address corresponding to the designated degrees of latitude and longitude is used as a first search term, followed by changing the block and house number of the address within the area for subsequent search processes. Depending upon the designated degrees of latitude and longitude and the size, the street name or the like may be changed to scan the area to conduct the search processes. Each time receiving the search result (establishment information), the user terminal successively superimposes the establishment information on the map image displayed on the display. Accordingly, the user can see the map image which is being gradually completed with the establishment information successively superimposed thereon, and thereby the feeling of waiting is alleviated. Typically, a symbol indicative of the kind of business is successively superimposed on the two-dimensional map image, for example, the image M1 as illustrated in FIG. 17.

Furthermore, after the steps S2, S4 and S6 and/or during waiting for the response from the search engine between step S2 and step S4, the web server acquires a variety of content items such as establishment images and so forth on the basis of the establishment information in step S7 and step S8. Namely, the web server sends a request for establishment content to the web site as an information source in step S7, and receives the establishment content from the web site in step S8. For example, the web server accesses pages of the home page of each establishment through links to download images and so forth.

Also, in parallel with the process of acquiring content items, the web server transmits a request message to the street-level view server in step S9. This request message contains information about the degrees of latitude and longitude of the present location and a size of the view to request a street-level view corresponding to the area. In response to this request message, the street-level view server returns a street-level view corresponding to the area to the web server in step S10. The web server performs image analysis of the street-level view, and generates columnar images representing buildings. When no street-level view is available in the area, columnar images are generated by the method as explained the above embodiment.

Then, when the user desires to see a three-dimensional map image, a request message is transmitted to the web server by manipulation of the user terminal for obtaining information necessary for generating a three-dimensional map image (columnar images representing buildings). In response to this request message, in step S12, the web server transmits the columnar images (stereoscopic images) representing buildings to the user terminal together with the location information thereof. The user terminal generates a three-dimensional map image by superimposing the columnar images on the two-dimensional map image, and moving the viewpoint. By this process, for example, the user terminal displays the three-dimensional map image, for example, the image M2 as illustrated in FIG. 17.

Furthermore, when the user desires to see a detailed image of a particular floor of a particular building, in step S13, a request message is transmitted to the web server by manipulation of the user terminal for obtaining a floor image. In response to this request message, in step S14, the web server transmits the three-dimensional map image (floor image) in which various content items are arranged to the user terminal. The user terminal receives and displays the expanded three-dimensional map image, for example, the image M3 as illustrated in FIG. 17, on the display.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A computer program embedded in a non-transient computer-readable recording medium and adapted to generate a three-dimensional map image by using information on the Internet and for display on a user mobile terminal, the program including:

a module to receive a two-dimensional map at the mobile user terminal from a map server in response to the mobile user terminal transmitting a first request message to the map server designating a map area desired to be displayed, where the two-dimensional map does not include a geometric depiction of any business buildings;

a module to receive business establishment information at the mobile user terminal from a web server in response to the mobile user terminal transmitting a second request message to the web server designating the map area, where the business establishment information corresponds to one or more businesses located within the map area and includes at least one geometric depiction of one or more business buildings representing the one or more businesses located within the map area, and at least some of the business establishment information: (i) is gathered automatically by a web crawler to search a plurality of Internet web sites publicizing the at least some of the business establishment information, and to search based on one or more geographic locations of the one or more business buildings within the map area, and (ii) includes at least some goods and/or services offered by one or more of the businesses;

a module to superimpose the business establishment information, including the geometric depiction of one or more business buildings, onto the two dimensional map and for displaying the resultant two-dimensional image on the mobile user terminal;

a module configured to receive a 360° panoramic street-level view at the mobile user terminal corresponding to the map area in response to a third request message from the mobile user terminal to the web server corresponding to the map area;

a module configured to generate a three-dimensional columnar image representing the geometric depiction of the one or more business buildings included in the map area by subjecting the 360° panoramic street-level view to image processing;

a module configured to generate at the mobile user terminal a virtual three-dimensional map image corresponding to the map area, by superimposing the columnar image on the two-dimensional map, wherein the three-dimensional columnar image includes: (i) the at least some of the business establishment information; (ii) at least one multi-story building containing more than two stories with a plurality of businesses located on different stories; (iii) respective indicia of the plurality of businesses displayed in a manner that indicates on at least which floor of the building the business are located; and (iv) icons indicating the at least some goods and/or services offered by one or more of the businesses displayed representing such business; and a module configured to display the virtual three-dimensional map image corresponding to the map area on the user terminal.

2. The computer program adapted to generate a three-dimensional map image according to claim 1, wherein the virtual three-dimensional map image includes scenery computer graphics.

3. The computer program adapted to generate a three-dimensional map image according to claim 1, wherein the web server receives a supply of the 360° panoramic street-level view corresponding to the map area from the street-level view server by designating a latitude, a longitude, and a size.

4. The computer program adapted to generate a three-dimensional map image according to claim 2, wherein the web server receives a supply of the 360° panoramic street-level view corresponding to the map area from the street-level view server by designating a latitude, a longitude, and a size.

5. The computer program adapted to generate a three-dimensional map image according to claim 3, wherein the web server receives a supply of the map image corresponding to the map area from the map server in response to a request from the web server designating a latitude, a longitude, and a size.

6. The computer program adapted to generate a three-dimensional map image according to claim 4, wherein the web server receives a supply of the map image corresponding to the map area from the map server in response to a request from the web server designating a latitude, a longitude, and a size.

7. A method for generating a three-dimensional map image by using information on the Internet and for displaying the three-dimensional map image on a mobile user terminal:

receiving a two-dimensional map at the mobile user terminal from a map server over the Internet in response to the mobile user terminal transmitting a first request message to the map server designating a map area desired to be displayed, where the two-dimensional map does not include a geometric depiction of any business buildings;

receiving business establishment information at the mobile user terminal from a web server over the Internet in response to the mobile user terminal transmitting a second request message to the web server designating the map area, where the business establishment information corresponds to one or more businesses located within the map area and includes at least one geometric depiction of one or more business buildings representing the one or more businesses located within the map area, and at least some of the business establishment information: (i) is gathered automatically by a web crawler to search a plurality of Internet web sites publicizing the at least some of the business establishment information, and to search based on one or more geographic locations of the one or more business buildings within the map area, and (ii) includes at least some goods and/or services offered by one or more of the businesses;

superimposing the business establishment information, including the geometric depiction of one or more business buildings, onto the two dimensional map and for displaying the resultant two-dimensional image on the mobile user terminal;

receiving a 360° panoramic street-level view at the mobile user terminal corresponding to the map area over the Internet, in response to a third request message from the mobile user terminal to the web server corresponding to the map area;

generating a three-dimensional columnar image representing the geometric depiction of the one or more business buildings included in the map area by subjecting the 360° panoramic street-level view to image processing;

generating at the user terminal a virtual three-dimensional map image corresponding to the map area, by superimposing the columnar image on the two-dimensional map, wherein the three-dimensional columnar image includes: (i) the at least some of the business establishment information; (ii) at least one multi-story building containing more than two stories with a plurality of businesses located on different stories; (iii) respective indicia of the plurality of businesses displayed in a manner that indicates on at least which floor of the building the business are located; and (iv) icons indicating the at least some goods and/or services offered by one or more of the businesses displayed representing such business; and displaying the virtual three-dimensional map image corresponding to the map area on the user terminal.

8. A method for generating a virtual three-dimensional map image on a mobile user terminal, comprising:

receiving a two-dimensional map at the mobile user terminal from a map server in response to the mobile user terminal transmitting a first request message to the map server designating a map area desired to be displayed, where the two-dimensional map does not include a geometric depiction of any business buildings;

receiving business establishment information at the mobile user terminal from a web server in response to the mobile user terminal transmitting a second request message to the web server designating the map area, where the business establishment information corresponds at least to a number of businesses located within a building within the map area and includes at least one geometric depiction of one or more business buildings representing the one or more businesses located within the map area, and at least some of the business establishment information: (i) is gathered automatically by a web crawler to search a plurality of Internet web sites publicizing the at least some of the business establishment information, and to search based on one or more geographic locations of the one or more business buildings within the map area, and (ii) includes at least some goods and/or services offered by one or more of the businesses;

superimposing the business establishment information, including the geometric depiction of one or more business buildings, and at least a first hyperlink onto the two dimensional map and displaying the resultant two-dimensional image on the mobile user terminal, where the first hyperlink permits access to a first level of detail concerning the businesses located within the building;

receiving a 360° panoramic street-level view at the mobile user terminal corresponding to the map area in response to a third request message from the mobile user terminal to the web server;

generating a three-dimensional columnar image representing the geometric depiction of the one or more business buildings included in the map area by subjecting the 360° panoramic street-level view to image processing, the three-dimensional columnar image including at least one multi-story building containing more than two stories with a plurality of businesses located on different stories;

generating and displaying at the mobile user terminal a virtual three-dimensional map image corresponding to the map area, in response to a user of the mobile user terminal activating the first hyperlink, by superimposing the columnar image, including the at least one multi-story building, on the two-dimensional map such that: (i) a viewpoint in the virtual three-dimensional map image may be freely changed, (ii) respective indicia of the businesses located within the building are displayed on the columnar image of the building in a manner that indicates on at least which floor of the building the business are located, and (ii) respective second hyperlinks are included in association with each of the businesses, where each second hyperlink permits access to a respective second level of detail concerning the associated one of the businesses, wherein the at least some of the business establishment information is displayed on the columnar image in response to selecting the first hyperlink, associated with the at least one multi-story building: (i) is gathered automatically by a web crawler to search a plurality of Internet web sites publicizing the at least some of the business establishment information, and to search based on one or more geographic locations of the one or more business buildings within the map area, and (ii) includes at least some goods and/or services offered by one or more of the businesses; and modifying the virtual three-dimensional map image, in response to the user of the mobile user terminal activating the second hyperlinks, such that icons indicating the at least some goods and/or services offered by the associated one of the businesses are displayed within a virtual three-dimensional space representing such business.

9. The method according to claim 8, further comprising:

generating scenery computer graphics at the mobile user terminal in response to a change a viewpoint in the virtual three-dimensional space corresponding to the map area, and displaying the scenery computer graphics corresponding to the map area on the user terminal.

10. The method according to claim 8, wherein the web server receives a supply of street-level views corresponding to the map area from the street-level view server by designating a latitude, a longitude, and a size.

11. The method according to claim 9, wherein the web server receives a supply of street-level views corresponding to the map area from the street-level view server by designating a latitude, a longitude, and a size.

12. The method according to claim 10, wherein the web server receives a supply of the map images corresponding to the map area from the map server in response to a request from the web server designating a latitude, a longitude, and a size.

13. The method according to claim 11, wherein the web server receives a supply of the map images corresponding to the map area from the map server in response to a request from the web server designating a latitude, a longitude, and a size.

14. A non-transitory, computer readable storage medium containing a computer program, which when executed on a computer system causes such system to carry out actions for generating a virtual three-dimensional map image on a mobile user terminal, comprising:
 receiving a two-dimensional map at the mobile user terminal from a map server in response to the mobile user terminal transmitting a first request message to the map server designating a map area desired to be displayed, where the two-dimensional map does not include a geometric depiction of any business buildings;
 receiving business establishment information at the mobile user terminal from a web server in response to the mobile user terminal transmitting a second request message to the web server designating the map area, where the business establishment information corresponds at least to a number of businesses located within a building within the map area and includes at least one geometric depiction of one or more business buildings representing the one or more businesses located within the map area, and at least some of the business establishment information: (i) is gathered automatically by a web crawler to search a plurality of Internet web sites publicizing the at least some of the business establishment information, and to search based on one or more geographic locations of the one or more business buildings within the map area, and (ii) includes at least some goods and/or services offered by one or more of the businesses;
 superimposing the business establishment information, including the geometric depiction of one or more business buildings, and at least a first hyperlink onto the two dimensional map and displaying the resultant two-dimensional image on the mobile user terminal, where the first hyperlink permits access to a first level of detail concerning the businesses located within the building;
 receiving a 360° panoramic street-level view at the mobile user terminal corresponding to the map area in response to a third request message from the mobile user terminal to the web server;
 generating a three-dimensional columnar image representing the geometric depiction of the one or more business buildings included in the map area by subjecting the 360° panoramic street-level view to image processing, the three-dimensional columnar image including at least one multi-story building containing more than two stories with a plurality of businesses located on different stories;
 generating and displaying at the mobile user terminal a virtual three-dimensional map image corresponding to the map area, in response to a user of the mobile user terminal activating the first hyperlink, by superimposing the columnar image, including the at least one multi-story building, on the two-dimensional map such that: (i) a viewpoint in the virtual three-dimensional map image may be freely changed, (ii) respective indicia of the businesses located within the building are displayed on the columnar image of the building in a manner that indicates on at least which floor of the building the business are located, and (ii) respective second hyperlinks are included in association with each of the businesses, where each second hyperlink permits access to a respective second level of detail concerning the associated one of the businesses, wherein the at least some of the business establishment information is displayed on the columnar image in response to selecting the first hyperlink, associated with the at least one multi-story building: (i) is gathered automatically by a web crawler to search a plurality of Internet web sites publicizing the at least some of the business establishment information, and to search based on one or more geographic locations of the one or more business buildings within the map area, and (ii) includes at least some goods and/or services offered by one or more of the businesses; and
 modifying the virtual three-dimensional map image, in response to the user of the mobile user terminal activating the second hyperlinks, such that icons indicating the at least some goods and/or services offered by the associated one of the businesses are displayed within a virtual three-dimensional space representing such business.

* * * * *